US012638307B2

(12) United States Patent
Parian et al.

(10) Patent No.: US 12,638,307 B2
(45) Date of Patent: May 26, 2026

(54) ON-SITE COMPENSATION OF MEASUREMENT DEVICES

(71) Applicant: FARO Technologies, Inc., Lake Mary, FL (US)

(72) Inventors: Jafar Amiri Parian, Schlieren (CH); Martin Ossig, Tamm (DE); Hani Kaabi, Korntal-Münchingen (DE); Johannes Buback, Korntal-Münchingen (DE); Fabian Hargart, Ludwigsburg (DE)

(73) Assignee: FARO Technologies, Inc., Lake Mary, FL (US)

( * ) Notice: Subject to any disclaimer, the term of this patent is extended or adjusted under 35 U.S.C. 154(b) by 404 days.

(21) Appl. No.: 18/330,685

(22) Filed: Jun. 7, 2023

(65) Prior Publication Data

US 2023/0400330 A1 Dec. 14, 2023

Related U.S. Application Data

(60) Provisional application No. 63/350,419, filed on Jun. 9, 2022.

(51) Int. Cl.
*G01C 25/00* (2006.01)
*G01C 15/00* (2006.01)
*G01C 15/06* (2006.01)
*G06F 18/2413* (2023.01)

(52) U.S. Cl.
CPC .......... *G01C 25/00* (2013.01); *G01C 15/002* (2013.01); *G01C 15/06* (2013.01); *G06F 18/24147* (2023.01)

(58) Field of Classification Search
CPC ...... G01C 25/00; G01C 15/002; G01C 15/06; G06F 18/24147; G01B 11/24; G01B 21/042; G01S 7/497
See application file for complete search history.

(56) References Cited

U.S. PATENT DOCUMENTS

2021/0011158 A1 1/2021 Nagalla et al.

FOREIGN PATENT DOCUMENTS

| CN | 103562676 A | * | 2/2014 | ........... G01B 11/251 |
| WO | 2016/040229 A1 | | 3/2016 | |
| WO | WO 2016180702 A1 | * | 11/2016 | ............. A61B 3/113 |

OTHER PUBLICATIONS

European Office Action for Application No. 23177504.0, dated Mar. 1, 2024, 9 pages.

* cited by examiner

*Primary Examiner* — Tung S Lau
(74) *Attorney, Agent, or Firm* — McCarter & English, LLP; Dave S. Christensen; Joseph C. Drish

(57) ABSTRACT

A system includes one or more processors that are configured to compensate a measurement tool by performing a method. The method includes capturing a first data using the measurement tool. The method further includes capturing a second data using the measurement tool. The method further includes detecting a first natural feature in the first data. The method further includes computing a difference in positions of the first natural feature in the first data and the second data respectively. The method further includes computing a compensation parameter to adjust the measurement tool based on the difference computed.

13 Claims, 26 Drawing Sheets

ON-SITE COMPENSATION OF MEASUREMENT DEVICES

CROSS-REFERENCE TO RELATED APPLICATION

This application claims the benefit of U.S. Provisional Application No. 63/350,419, entitled "ON-SITE COMPEN-SATION OF MEASUREMENT DEVICES", filed on Jun. 9, 2022, the contents of which are incorporated by reference herein in their entirety.

BACKGROUND

The subject matter disclosed herein relates to use of a measurement tools, such as laser scanners, and performing on-site compensation of the measurement tools. Such compensation of the measurement tools is a pre-requisite for the measurement tools to be able to capture accurate digital representation and measurements of the surroundings.

Various applications such as facility management, forensic/crime scene investigation, accident reconstruction, architectural/civil engineering, and heritage documentation/restoration, use various types of measurement tools such as two-dimensional (2D), and three-dimensional (3D) laser scanners. For example, volume scanners are used to capture measurements of entire environments, such as crime scenes, building facades, or complex piping and wiring, and various other such cumbersome tasks. Measurement devices provide an economical way of capturing and analyzing millions (or more) of 3D data points in the environment to facilitate generating detailed 2D and/or 3D images of complex environments and geometries. In addition, measurement tools such as 3D images facilitate performing inspections and verify assemblies of products in an industrial setting accurately, and at relatively lesser cost. Measurement devices also include laser trackers that perform precise coordinate measuring that can facilitate industrial operations such as alignment, installation, part inspection, and other types of manufacturing and assembly integration projects.

While existing measurement tools are suitable for their intended purposes, what is needed is a system having certain features of aspects of the present disclosure.

BRIEF DESCRIPTION

According to one or more aspects, a system includes one or more processors that are configured to compensate a measurement tool by performing a method. The method includes capturing a first data using the measurement tool. The method further includes capturing a second data using the measurement tool. The method further includes detecting a first natural feature in the first data. The method further includes computing a difference in positions of the first natural feature in the first data and the second data respectively. The method further includes computing a compensation parameter to adjust the measurement tool based on the difference computed.

In one or more example aspects, the first data is captured by a front face of the measurement tool and the second data is captured by a back face of the measurement tool.

In one or more example aspects, the first data and the second data comprise images. The first data and the second data further comprise depth data.

In one or more example aspects, natural features are detected using feature extraction.

In one or more example aspects, natural features from the first data are matched to the corresponding features in the second data using template matching.

In one or more example aspects, natural features from the first data are matched with the natural features in the second data by using nearest neighbor search.

In one or more example aspects, the first natural feature is a plurality of features, and wherein the method further comprises determining, based on a first timepoint at which the plurality of features was captured in the first data and a second timepoint at which the plurality of features was captured in the second data, that the measurement tool is not sufficiently configured for compensation.

In one or more example aspects, the method further includes, in response to the measurement tool being sufficiently configured for compensation, applying the compensation parameter to the measurement tool.

In one or more example aspects, the method further includes, in response to the measurement tool being insufficiently configured for compensation, bypassing applying the compensation parameter to the measurement tool.

In one or more example aspects, the method further includes storing the compensation parameter temporarily, periodically checking the sufficiency of configuration of the measurement tool for compensation, and, in response to the measurement tool being sufficiently configured for compensation, applying the temporarily stored compensation parameter to the measurement tool.

In one or more example aspects, the compensation parameter is a first compensation parameter, and the method further includes storing the first compensation parameter temporarily, computing a second compensation parameter based on the first compensation parameter and a model of the measurement tool associated with the insufficient configuration, and applying the second compensation parameter to the measurement tool.

In one or more example aspects, based on repetitive measurement of the features in the first data and the second data, features are assigned a quality/repeatability score.

In one or more example aspects, the first natural feature is used for computing the compensation parameter only in response to the quality/repeatability score of the first natural feature being at least a predetermined value.

According to one or more aspects, a computer-implemented method for on-site compensation of a measurement tool includes capturing a first data using the measurement tool. The method further includes capturing a second data using the measurement tool. The method further includes detecting a first natural feature in the first data. The method further includes computing a difference in positions of the first natural feature in the first data and the second data respectively. The method further includes computing a compensation parameter to adjust the measurement tool based on the difference computed.

In one or more example aspects, the first data is captured by a front face of the measurement tool and the second data is captured by a back face of the measurement tool.

In one or more example aspects, the first natural feature is a plurality of features, and wherein the computer-implemented method further comprises determining, based on a first timepoint at which the plurality of features was captured in the first data and a second timepoint at which the plurality of features was captured in the second data, that the measurement tool is not sufficiently configured for compensation.

In one or more example aspects, the computer-implemented method further includes, in response to the measurement tool being determined to be insufficiently config-
ured for compensation. The method further includes,
applying the compensation parameter to the measurement
tool after waiting for at least a predetermined duration, and
in response to the measurement tool sufficiently being
configured for compensation. Alternatively, a second com-
pensation parameter is computed for the measurement tool
based on a present configuration state of the measurement
tool, and the second compensation parameter is applied.

According to one or more aspects, a computer program
product includes a computer-readable memory device that
comprises one or more computer-executable instructions,
which when executed by one or more processing units cause
the one or more processing units to perform a method for
on-site compensation of a measurement tool. The method
includes capturing a first data using the measurement tool.
The method further includes capturing a second data using
the measurement tool. The method further includes detect-
ing a first natural feature in the first data. The method further
includes computing a difference in positions of the first
natural feature in the first data and the second data respec-
tively. The method further includes computing a compen-
sation parameter to adjust the measurement tool based on the
difference computed.

In one or more example aspects, the first natural feature
is a plurality of features, and wherein the computer-imple-
mented method further comprises determining, based on a
first timepoint at which the plurality of features was captured
in the first data and a second timepoint at which the plurality
of features was captured in the second data, that the mea-
surement tool is not sufficiently configured for compensa-
tion.

These and other advantages and features will become
more apparent from the following description taken in
conjunction with the drawings.

BRIEF DESCRIPTION OF THE DRAWINGS

The subject matter, which is regarded as the invention, is
particularly pointed out and distinctly claimed in the claims
at the conclusion of the specification. The foregoing and
other features, and advantages of the invention are apparent
from the following detailed description taken in conjunction
with the accompanying drawings in which:

The detailed description explains aspects of the invention,
together with advantages and features, by way of example
with reference to the drawings.

DETAILED DESCRIPTION

Aspects of technical solutions described herein relate to
automated compensation of a measurement tool used to
capture digital representation (e.g., point cloud, 2D map, 3D
map, etc.) of a surrounding environment, or a part thereof.
The measurement tool can be a laser scanner, (e.g., FARO®
FREESTYLE®, FOCUS® SCANPLAN®) 3D imager,
laser tracker, laser projector, or any other type of measure-
ment tool. For a measurement tool, an "on-site compensa-
tion" (or simply "compensation") is a procedure to test and
improve the angular accuracy of the measurement tool.
Compensation is used to adjust the performance of a mea-
surement tool, keeping its performance within a stated
accuracy range.

Existing techniques for the compensation requires an
operator of the measurement tool to spend substantial time,
efforts, and material resources to build a special test setup
and specific protocols have to be followed by the operator to
obtain a successful compensation.

Figure 1:
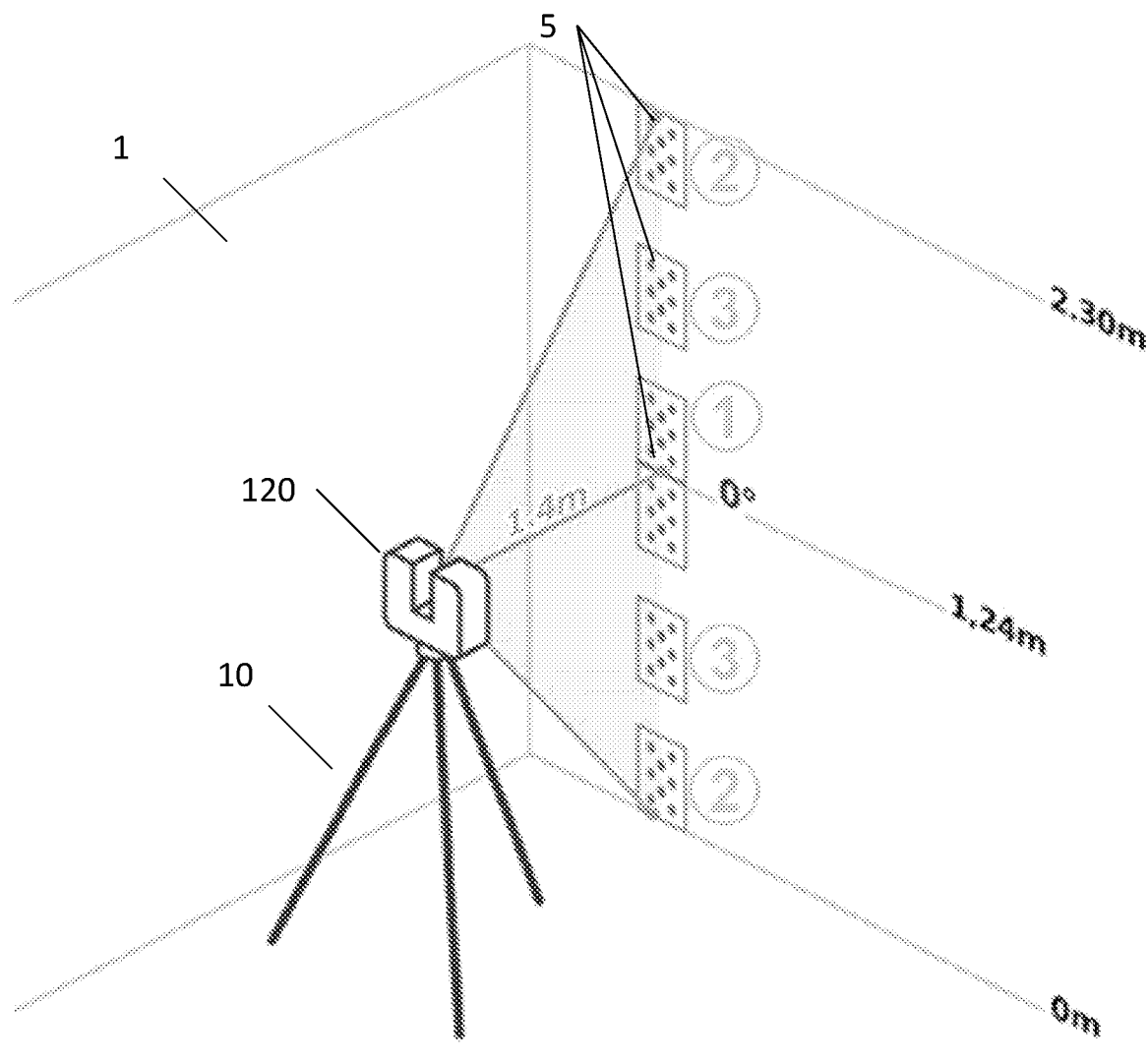
FIG. 1 depicts existing compensation setup.

FIG. 1 depicts an example compensation setup for some
measurement tools according to existing techniques. For
example, for some laser scanners 120, the compensation
includes selecting a room/area 1 without movements or the
presence of other people during the compensation process.
The area 1 has to comply with specific requirements, such as
height, reflective surfaces (e.g., no windows), etc. Further,
the area 1 has to be set up with pre-defined targets 5 (e.g.,
preprinted target sheets having known elements from the
manufacturer) according to a prescribed pattern. The mea-
surement tool 120 is then placed as prescribed, for example,
at a particular distance from the targets 5, at a certain height,
etc. The measurement tool 120 may have to be placed on a
support 10, e.g., tripod. At this time, using an interface of the
measurement tool, a scan-and-compensation process is ini-
tiated, which results in a compensation report. The compen-
sation report indicates recommended adjustments to the
measurement tool 120 to compensate for horizontal error,
vertical error, or any other diagnosis obtained during the
compensation. The operator can select to apply the recom-
mended adjustments, for example, via the interface of the
measurement tool 120.

Aspects of the present disclosure provide technical solu-
tions to technical challenges in coordinate measurement and
digital representation capture tools. The measurement tools
can capture two-dimensional or three-dimensional (3D)
scans or measurements. Such measurements/scans can
include 3D coordinates, 2D maps, 3D point clouds, or a
combination thereof. The measurements/scans can include
additional components, such as annotations, images, tex-
tures, measurements, and other details.

Figure 11:
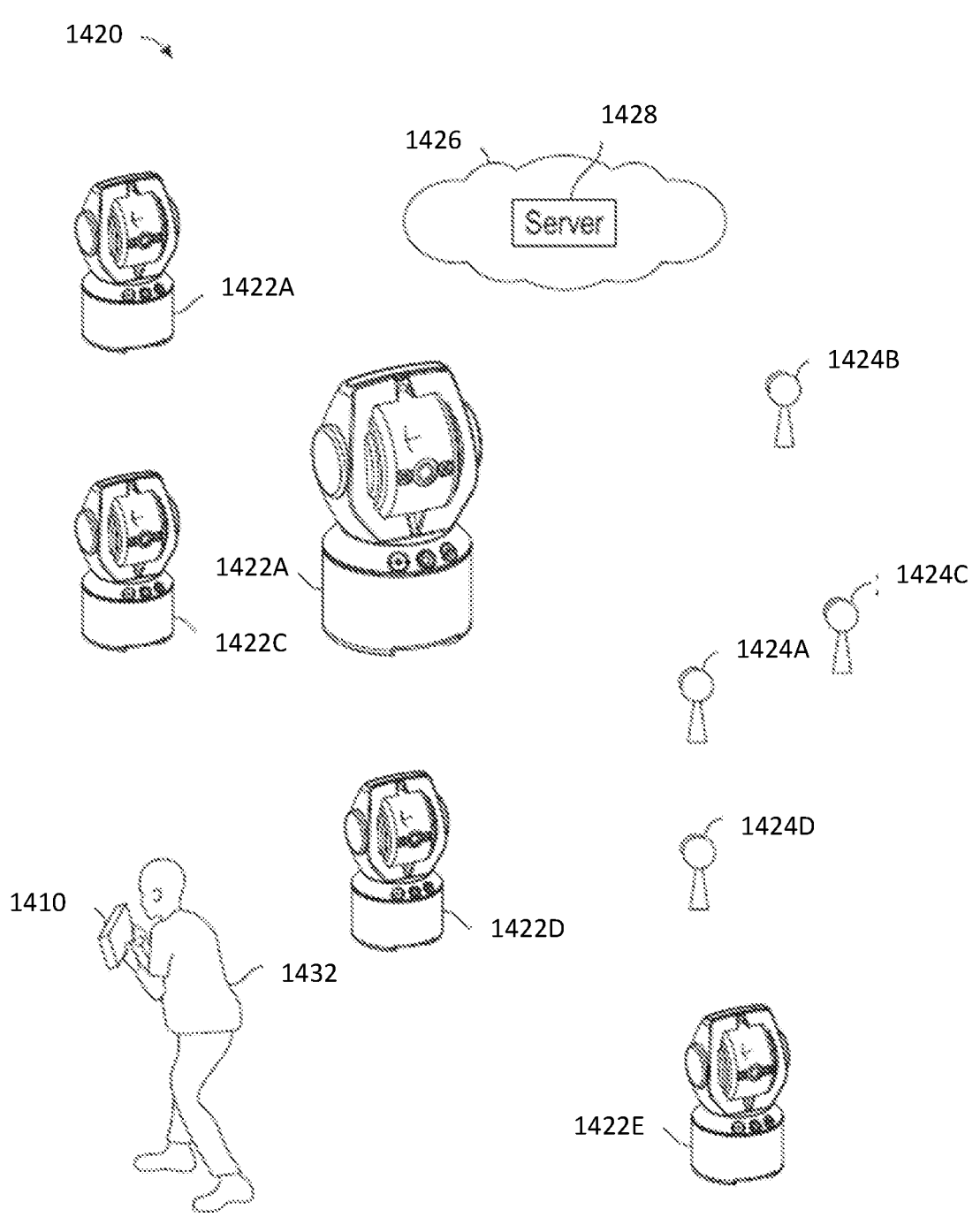
FIGS. 11-13 depict an embodiment of a laser tracker
device.

A laser tracker device is a metrology device that measures
positional coordinates using laser light. Laser tracker
devices of the type discussed herein may be used in manu-
facturing environments where it is desired to measure objects, parts, or assemblies with a high level of accuracy. It should be appreciated in some applications, multiple laser tracker devices may be used and may be positioned in locations that are distant from an operator. An exemplary embodiment of a laser tracker system 20 is provided that allows an operator or user to control and operate the functions of a desired laser tracker device is illustrated in FIG. 11 (described later herein).

The laser tracker system 1420 includes at least one laser tracker device 1422A, and may include a plurality of laser tracker devices 1422B-1422E. The system 1420 further includes at least one retroreflective target 1424A, and may include a plurality of retroreflective targets 1424B-1424D. As will be discussed in more detail herein, the retroreflective targets 1424A-1424D cooperate with laser light emitted by the laser tracker devices 1422A-1422E to allow a laser tracker device to measure the distance between the laser tracker device and the retroreflective target. With the distance to the retroreflective device determined, angular measurement tools, such as angular encoders for example, in the laser tracker device allow for the determination of the coordinates of the retroreflective device in a laser tracker device frame of reference.

The system 1420 further includes a computer network 1426 that may include one or more nodes 1428, such as a computer server for example. The computer network 1426 may be any known computer network, such as but not limited to a local area network (LAN), a wide-area network (WAN), a cellular network or the Internet for example. In an embodiment, each of the laser tracker devices includes communications circuits, such as Ethernet (IEEE 802.3), WiFi (IEEE 802.11) or cellular communications circuits for example, that are configured to transmit to and receive signals from the computer network 1426. The system 1420 further includes at least one mobile computing device 30. As will be discussed in more detail herein, the mobile computing device 30 includes communications circuits that allow the mobile computing device 30 to transmit to and receive signals from the computer network. As will be discussed in more detail herein, the computer network 1426 allows the mobile computing device 30 to transmit signals to and receive signals from one or more of the laser tracker devices 1422A-1422E.

As used herein, the term "mobile computing device" refers to a computing device having one or more processors, a display, and non-transitory memory that includes computer readable instructions. The mobile computing device also includes a power source, such as a battery for example, that allows a user to move about the environment with the mobile computing device. The mobile computing device is sized and shaped to be carried by a single person. In an embodiment, the mobile computing device may be but is not limited to a cellular phone, a smartphone, a personal digital assistant, a tablet computer, a laptop computer or a convertible laptop computer for example.

Other types of coordinate measurement tools measure an area as opposed to discrete points, as is done in the laser tracker of FIG. 11. Because coordinate points for an area are being measured simultaneously, this measurement process is sometimes referred to as a "scan." Typically, when capturing a scan of an environment, a version of the simultaneous localization and mapping (SLAM) algorithm is used. For completing such scans a scanner, such as the FARO® SCANPLAN®, FARO® SWIFT®, FARO® FREESTYLE®, or any other measurement system incrementally builds the scan of the environment, while the scanner is moving through the environment, and simultaneously the scanner tries to localize itself on this scan that is being generated. An example of a handheld scanner is described in U.S. patent application Ser. No. 15/713,931, the contents of which is incorporated by reference herein in its entirety. This type of scanner may also be combined with a another scanner, such as a time of flight scanner as is described in commonly owned U.S. patent application Ser. No. 16/567,575, the contents of which are incorporated by reference herein in its entirety. It should be noted that the scanners listed above are just examples of measurement tools and that the type of scanner used in one or more aspects does not limit the features of the technical solutions described herein.

Figure 2:
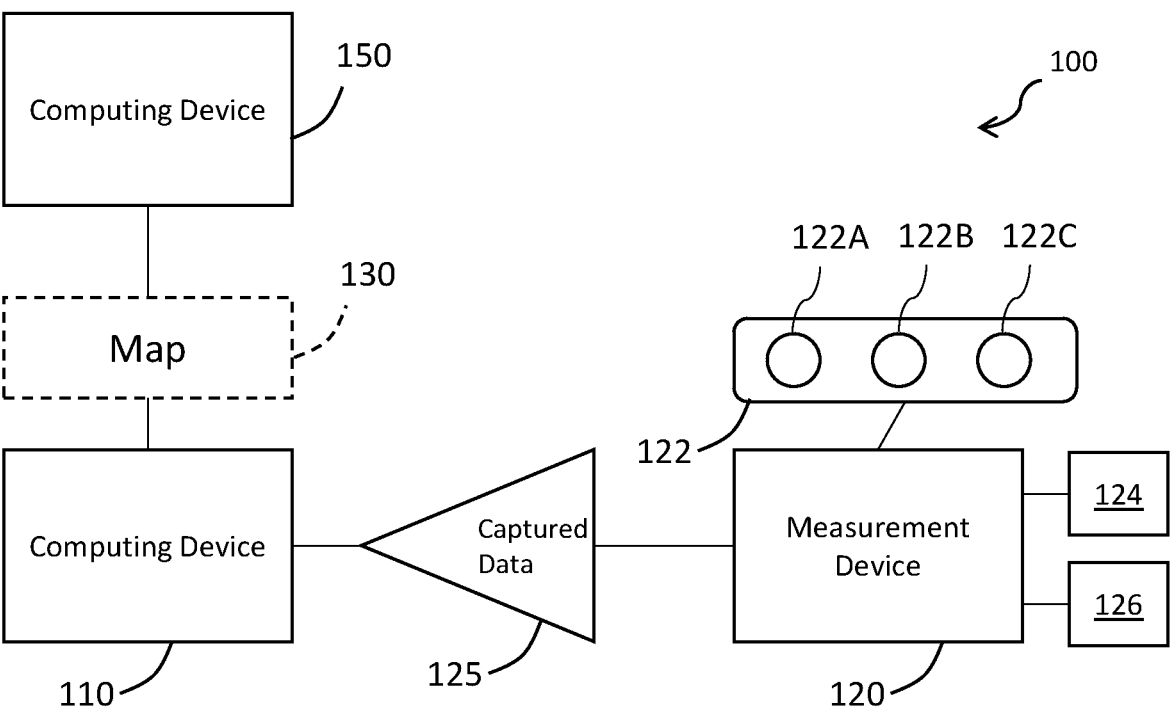
FIG. 2 depicts a system for capturing measurements in an
environment according to one or more aspects.

FIG. 2 depicts a system for capturing measurements in an environment according to one or more aspects. The measurement system 100 includes a computing system 110 coupled with the measurement tool 120. The coupling facilitates wired and/or wireless communication between the computing system 110 and the measurement tool 120. The measurement tool 120 can include a laser tracker, a 2D laser scanner ("2D scanner"), a 3D laser scanner ("3D scanner"), or any other measurement tool. The captured data 125 from the measurement tool 120 includes measurements of a portion from the environment. The captured data 125 is transmitted to the computing system 110 for storage. The computing device 110 can store the captured data 125 locally, i.e., in a storage device in the computing device 110 itself, or remotely, i.e., in a storage device that is part of another computing device 150. The computing device 150 can be a computer server, or any other type of computing device that facilitates remote storage and processing of the captured data 125.

In one or more aspects, the captured data 125 can be used to generate a map 130 of the environment in which the measurement tool 120 is being moved. The computing device 110 and/or the computing device 150 can generate the map 130. The map 130 can be generated by combining several instances of the captured data 125, for example, submaps. Each submap can be generated using SLAM, which includes generating one or more submaps corresponding to one or more portions of the environment. The submaps are generated using the one or more sets of measurements from the sets of sensors 122. The submaps are further combined by the SLAM algorithm to generate the map 130.

The captured data 125 can include one or more point clouds, distance of each point in the point cloud(s) from the measurement tool 120, color information at each point, radiance information at each point, and other such sensor data captured by the set of sensors 122 that is equipped on the measurement tool 120. For example, the sensors 122 can include a LIDAR 122A, a depth camera 122B, a camera 122C, etc.

The measurement tool 120 can also include an inertial measurement unit (IMU) 126 to keep track of a pose, including a 3D orientation, of the measurement tool 120. Alternatively, or in addition, the captured data 125 the pose can be extrapolated by using the sensor data from sensors 122, the IMU 126, and/or from sensors besides the range finders.

It should be noted that a "submap" is a representation of a portion of the environment and that the map 130 of the environment includes several such submaps "stitched" together. Stitching the maps together includes determining one or more landmarks on each submap that is captured and aligning and registering the submaps with each other to generate the map 130. In turn, generating each submap includes combining or stitching one or more sets of captured data 125 from the measurement tool 120. Combining two or more captured data 125 requires matching, or registering one or more landmarks in the captured data 125 being combined.

Here, a "landmark" is a feature that can be detected in the captured data 125, and which can be used to register a point from a first captured data 125 with a point from a second captured data 125 being combined. For example, the landmark can facilitate registering a 3D point cloud with another 3D point cloud or to register an image with another image. Here, the registration can be done by detecting the same landmark in the two captured data 125 (images, point clouds, etc.) that are to be registered with each other. A landmark can include, but is not limited to features such as a doorknob, a door, a lamp, a fire extinguisher, or any other such identification mark that is not moved during the scanning of the environment. The landmarks can also include stairs, windows, decorative items (e.g., plant, picture-frame, etc.), furniture, or any other such structural or stationary objects. In addition to such "naturally" occurring features, i.e., features that are already present in the environment being scanned, landmarks can also include "artificial" landmarks that are added by the operator of the measurement tool 120. Such artificial landmarks can include identification marks that can be reliably captured and used by the measurement tool 120. Examples of artificial landmarks can include predetermined markers, such as labels of known dimensions and patterns, e.g., a checkerboard pattern, a target sign, spheres, or other such preconfigured markers.

In the case of some of the measurement tools 120, such as a volume scanner, the computing device 110, 150 can implement SLAM while building the scan to prevent the measurement tool 120 from losing track of where it is by virtue of its motion uncertainty because there is no presence of an existing map of the environment (the map is being generated simultaneously). It should be noted that in the case of some types of the measurement tools 120, SLAM is not performed. For example, in the case of a laser tracker 20, the captured data 125 from the measurement tool 120 is stored, without performing SLAM.

Figure 3:
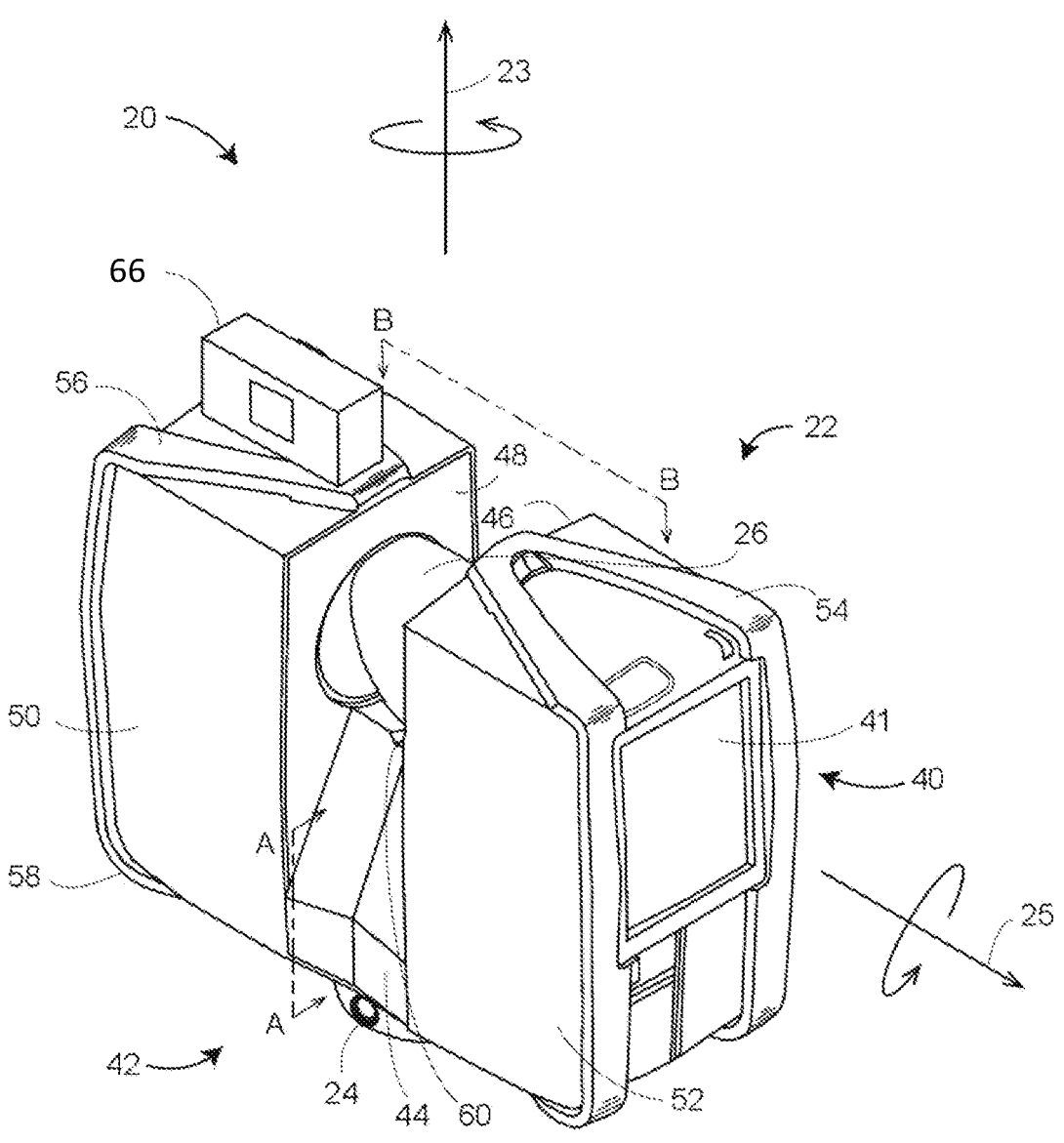
FIGS. 3, 4, and 5 depict a laser scanner for optically
scanning and measuring the environment surrounding the
laser scanner.
Figure 4:
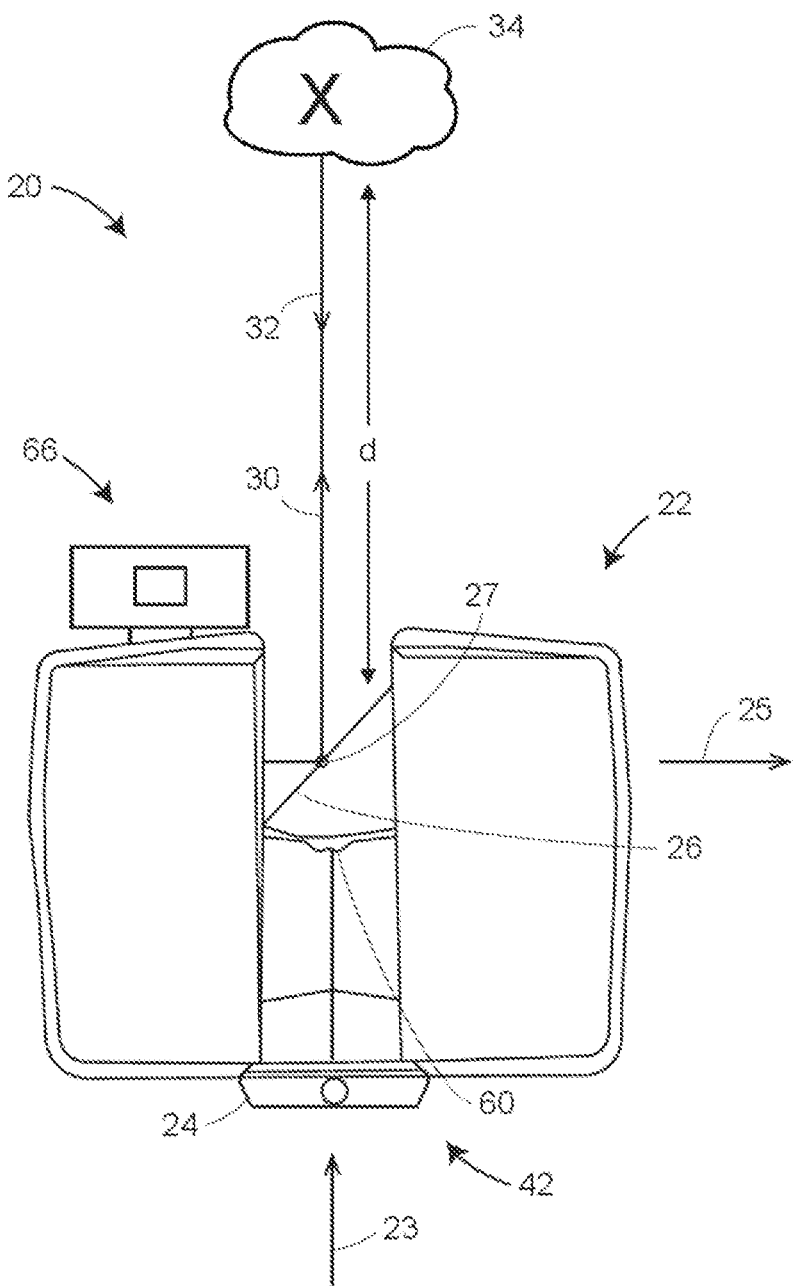
Figure 5:
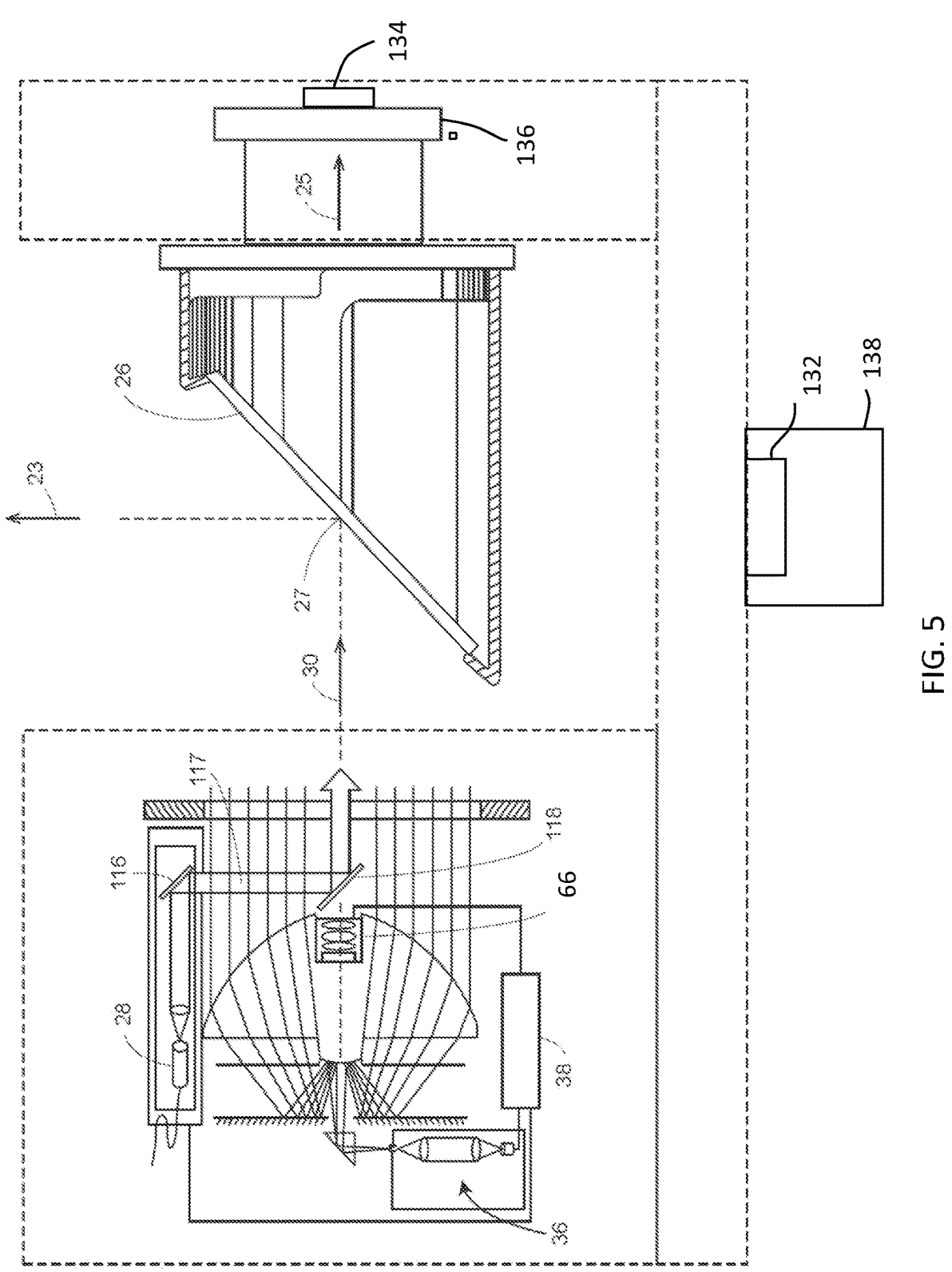

Referring now to FIGS. 3-5, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement tool on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other aspects, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other aspects, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera with an ultrawide-angle lens, sometimes referred to as a "fisheye camera."

In an embodiment, the camera 66 is located internally to the scanner and may have the same optical axis as the 3D scanner device. In this embodiment, the camera 66 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other aspects, the determination of whether the light passes through the beam-splitter 118 or is reflected depends on the polarization of the light. The camera 66 obtains 2D images of the scanned area to capture color data to add to the captured point cloud. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 6:
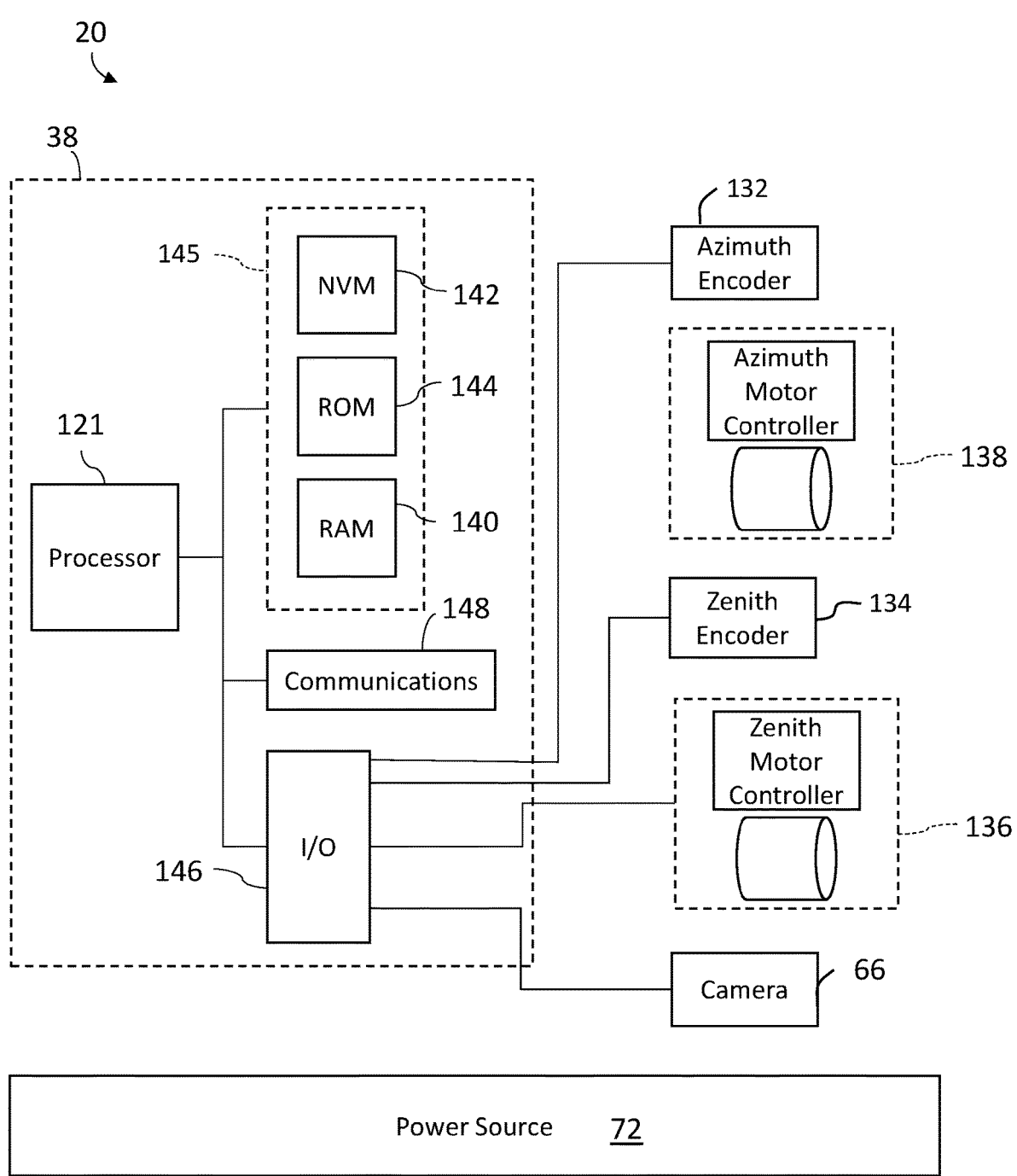
FIG. 6 shows a block diagram of elements of a laser
scanner according to one or more aspects.

Referring now to FIG. 6 with continuing reference to FIGS. 3-5, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 121 have access to memory 125 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 66, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 66 and is given certain instructions for the purpose of generating a 3D point cloud of a scanned environment. Controller 38 provides operating signals to the light source 28, light receiver 36, panoramic camera 66, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touchscreen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 121 are coupled to memory 125. The memory 125 may include random access memory (RAM) device 140, a non-volatile memory (NVM) device 142, and a read-only memory (ROM) device 144. In addition, the processors 121 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods described herein, which can be embodied in application code. For example, these methods are embodied in computer instructions written to be executed by processors 121, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

Figure 7A:
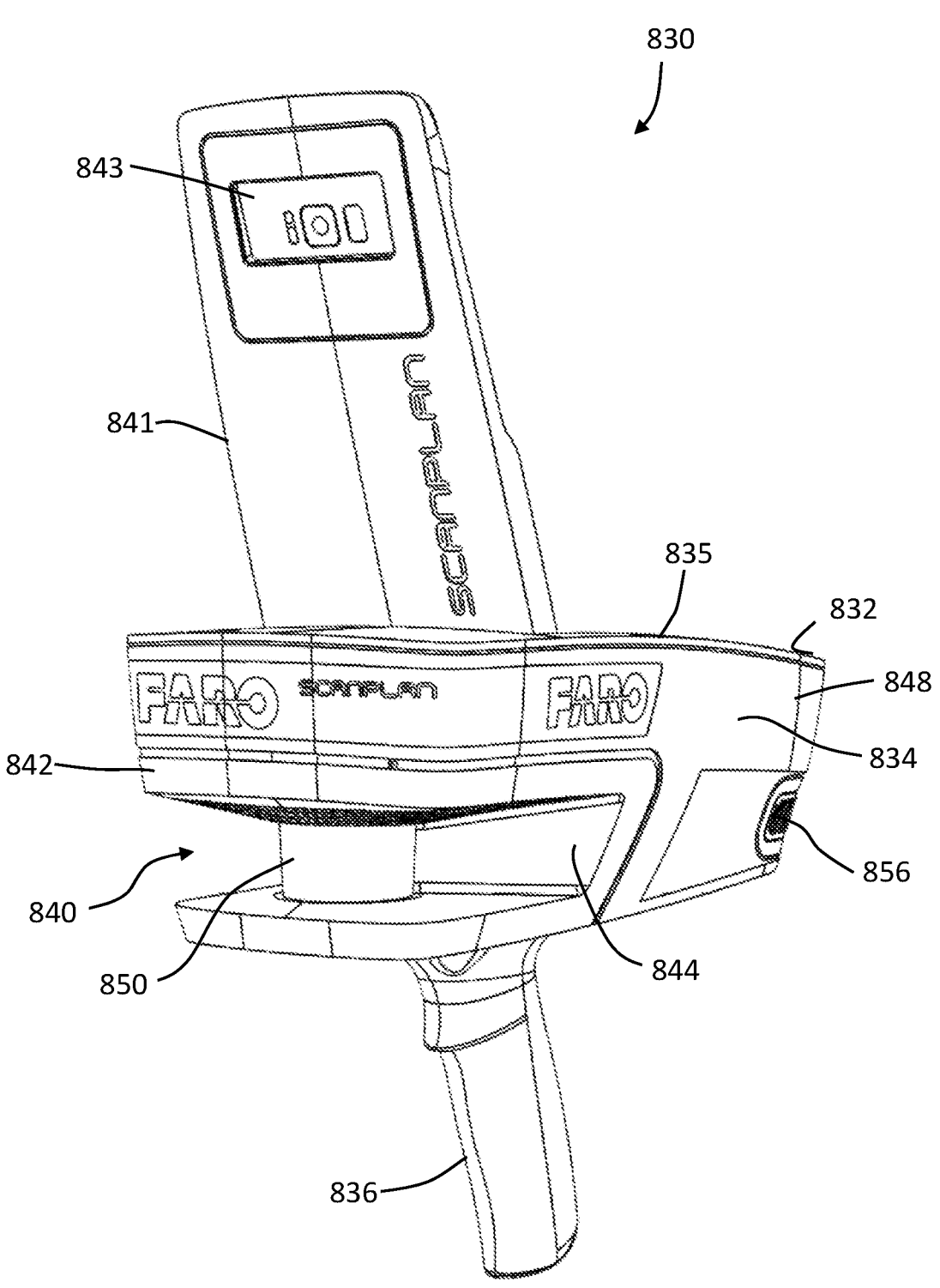
FIGS. 7A-7C depict an embodiment of a 2D scanner.
Figure 7B:
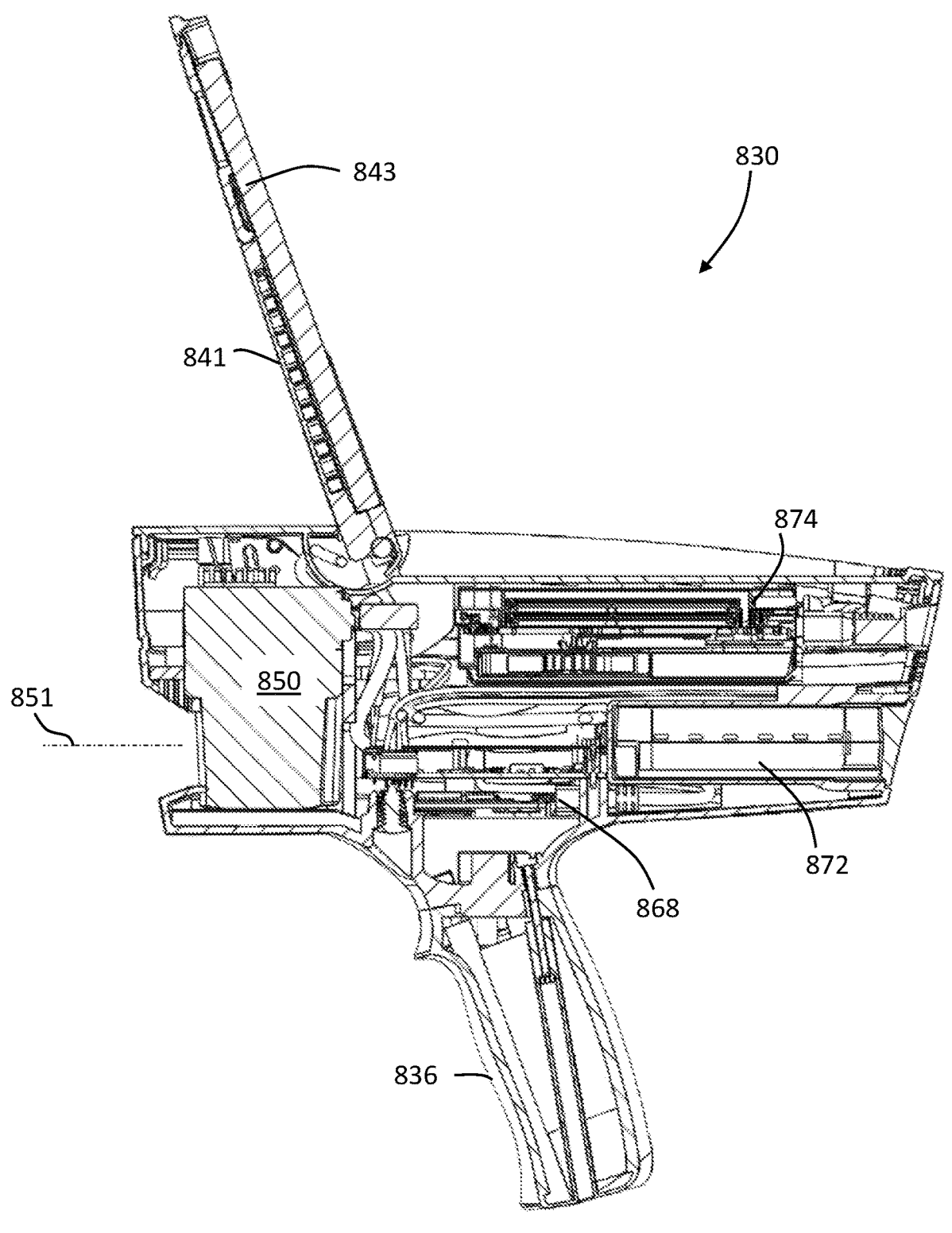
Figure 7C:
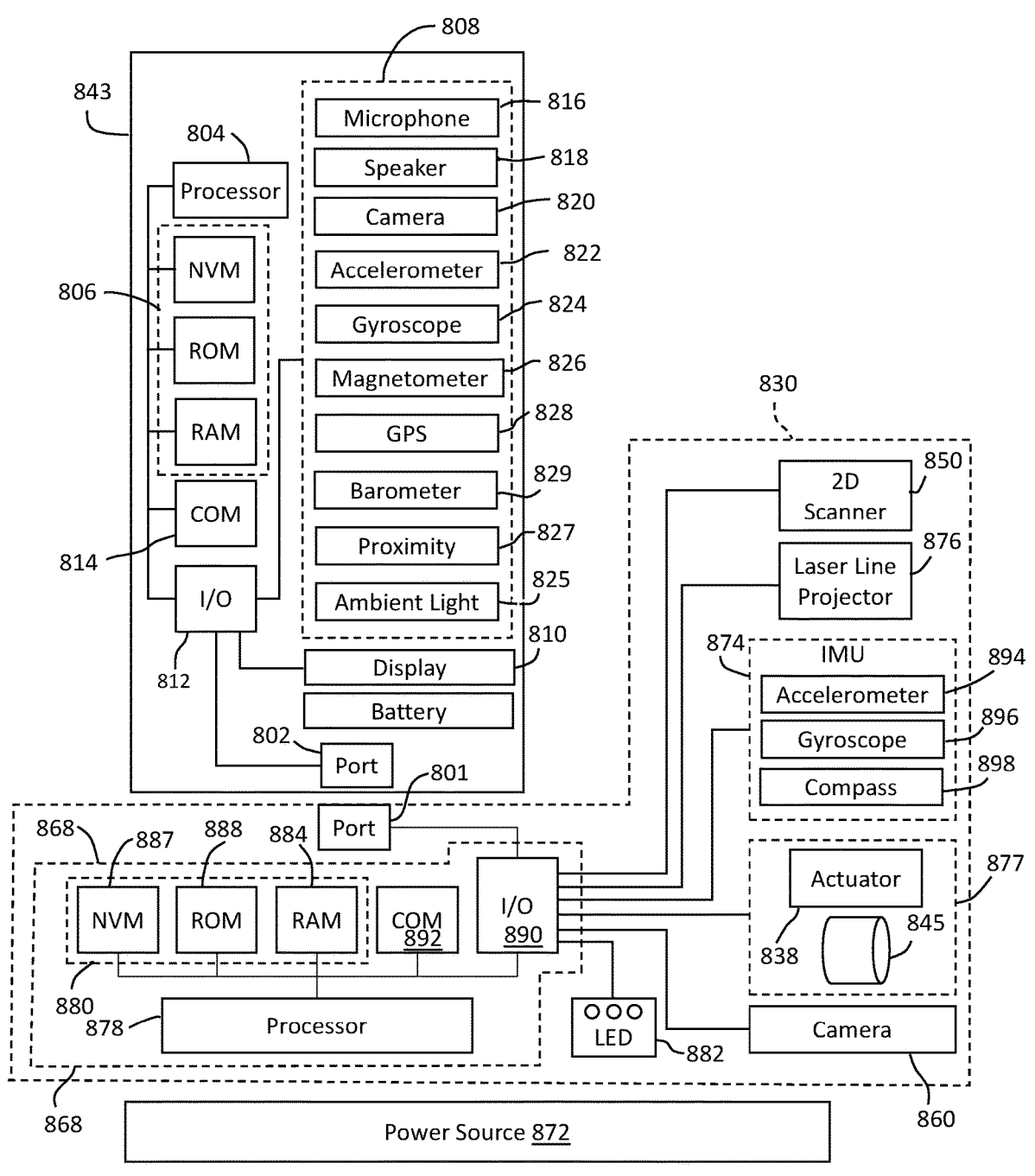

Referring now to FIGS. 7A-7C, an embodiment of a 2D scanner 830 is shown having a housing 832 that includes a body portion 834 and a removable handle portion 836. It should be appreciated that while the embodiment of FIGS. 7A-7C illustrate the 2D scanner 830 with the handle 836 attached, the handle 836 may be removed before the 2D scanner 830 is coupled to the base unit when used in the embodiment shown. In an embodiment, the handle 836 may include an actuator 838 that allows the operator to interact with the scanner 830. In the exemplary embodiment, the body 834 includes a generally rectangular center portion 835 with a slot 840 formed in an end 842. The slot 840 is at least partially defined by a pair walls 844 that are angled towards a second end 848. As will be discussed in more detail herein, a portion of a 2D laser scanner 850 is arranged between the walls 844. The walls 844 are angled to allow the 2D laser scanner 850 to operate by emitting a light over a large angular area without interference from the walls 844. As will be discussed in more detail herein, the end 842 may further include a three-dimensional camera or RGBD camera.

Extending from the center portion 835 is a mobile device holder 841. The mobile device holder 841 is configured to securely couple a mobile device 843 to the housing 832. The holder 841 may include one or more fastening elements, such as a magnetic or mechanical latching element for example, that couples the mobile device 843 to the housing 832. In an embodiment, the mobile device 843 is coupled to communicate with a controller 868. The communication between the controller 868 and the mobile device 843 may be via any suitable communications medium, such as wired, wireless or optical communication mediums for example.

In the illustrated embodiment, the holder 841 is pivotally coupled to the housing 832, such that it may be selectively rotated into a closed position within a recess 846. In an embodiment, the recess 846 is sized and shaped to receive the holder 841 with the mobile device 843 disposed therein.

In the exemplary embodiment, the second end 848 includes a plurality of exhaust vent openings 856. In an embodiment, the exhaust vent openings 856 are fluidly coupled to intake vent openings 858 arranged on a bottom surface 862 of center portion 835. The intake vent openings 858 allow external air to enter a conduit 864 having an opposite opening 866 in fluid communication with the hollow interior 867 of the body 834. In an embodiment, the opening 866 is arranged adjacent to a controller 868 which has one or more processors that is operable to perform the methods described herein. In an embodiment, the external air flows from the opening 866 over or around the controller 868 and out the exhaust vent openings 856.

In an embodiment, the controller 868 is coupled to a wall 870 of body 834. In an embodiment, the wall 870 is coupled to or integral with the handle 836. The controller 868 is electrically coupled to the 2D laser scanner 850, the 3D camera 860, a power source 872, an inertial measurement unit (IMU) 874, a laser line projector 876, and a haptic feedback device 877.

Referring now to FIG. 7C, elements are shown of the scanner 830 with the mobile device 843 installed or coupled to the housing 832. Controller 868 is a suitable electronic device capable of accepting data and instructions, executing the instructions to process the data, and presenting the results. The controller 868 includes one or more processing elements 878. The processors may be microprocessors, field programmable gate arrays (FPGAs), digital signal processors (DSPs), and generally any device capable of performing computing functions. The one or more processors 878 have access to memory 880 for storing information.

Controller 868 is capable of converting the analog voltage or current level provided by 2D laser scanner 850, camera 860 and IMU 874 into a digital signal to determine a distance from the scanner 830 to an object in the environment. In an embodiment, the camera 860 is a 3D or RGBD type camera. Controller 868 uses the digital signals that act as input to various processes for controlling the scanner 830. The digital signals represent one or more scanner 830 data including but not limited to distance to an object, images of the environment, acceleration, pitch orientation, yaw orientation and roll orientation. As will be discussed in more detail, the digital signals may be from components internal to the housing 832 or from sensors and devices located in the mobile device 843.

In general, when the mobile device 843 is not installed, controller 868 accepts data from 2D laser scanner 850 and IMU 874 and is given certain instructions for the purpose of generating a two-dimensional map of a scanned environment. Controller 868 provides operating signals to the 2D laser scanner 850, the camera 860, laser line projector 876 and haptic feedback device 877. Controller 868 also accepts data from IMU 874, indicating, for example, whether the operator is operating in the system in the desired orientation. The controller 868 compares the operational parameters to predetermined variances (e.g. yaw, pitch or roll thresholds) and if the predetermined variance is exceeded, generates a signal that activates the haptic feedback device 877. The data received by the controller 868 may be displayed on a user interface coupled to controller 868. The user interface may be one or more LEDs (light-emitting diodes) 882, an LCD (liquid-crystal diode) display, a CRT (cathode ray tube) display, or the like. A keypad may also be coupled to the user interface for providing data input to controller 868. In one embodiment, the user interface is arranged or executed on the mobile device 843.

The controller 868 may also be coupled to external computer networks such as a local area network (LAN) and the Internet. A LAN interconnects one or more remote computers, which are configured to communicate with controllers 868 using a well-known computer communications protocol such as TCP/IP (Transmission Control Protocol/Internee) Protocol), RS-232, ModBus, and the like. Additional scanners 830 may also be connected to LAN with the controllers 868 in each of these scanners 830 being configured to send and receive data to and from remote computers and other scanners 830. The LAN may be connected to the Internet. This connection allows controller 868 to communicate with one or more remote computers connected to the Internet.

The processors 878 are coupled to memory 880. The memory 880 may include random access memory (RAM) device 884, a non-volatile memory (NVM) device 886, a read-only memory (ROM) device 888. In addition, the processors 878 may be connected to one or more input/output (I/O) controllers 890 and a communications circuit 892. In an embodiment, the communications circuit 892 provides an interface that allows wireless or wired communication with one or more external devices or networks, such as the LAN discussed above or the communications circuit 818.

Controller 868 includes operation control methods embodied in application code. These methods are embodied in computer instructions written to be executed by processors 878, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hyper-Text Markup Language), Python, Ruby and any combination or derivative of at least one of the foregoing.

Coupled to the controller 868 is the 2D laser scanner 850. The 2D laser scanner 850 measures 2D coordinates in a plane. In the exemplary embodiment, the scanning is performed by steering light within a plane to illuminate object points in the environment. The 2D laser scanner 850 collects the reflected (scattered) light from the object points to determine 2D coordinates of the object points in the 2D plane. In an embodiment, the 2D laser scanner 850 scans a spot of light over an angle while at the same time measuring an angle value and corresponding distance value to each of the illuminated object points.

Examples of 2D laser scanners 850 include, but are not limited to Model LMS100 scanners manufactured by Sick, Inc. of Minneapolis, MN and scanner Models URG-04LX-UG01 and UTM-30LX manufactured by Hokuyo Automatic Co., Ltd of Osaka, Japan. The scanners in the Sick LMS100 family measure angles over a 270-degree range and over distances up to 20 meters. The Hoyuko model URG-04LX-UG01 is a low-cost 2D scanner that measures angles over a 240-degree range and distances up to 20 meters. The Hoyuko model UTM-30LX is a 2D scanner that measures angles over a 270-degree range and to distances up to 30 meters. It should be appreciated that the above 2D scanners are exemplary and other types of 2D scanners are also available.

In an embodiment, the 2D laser scanner 850 is oriented so as to scan a beam of light over a range of angles in a generally horizontal plane (relative to the floor of the environment being scanned). At instants in time the 2D laser scanner 850 returns an angle reading and a corresponding distance reading to provide 2D coordinates of object points in the horizontal plane. In completing one scan over the full range of angles, the 2D laser scanner returns a collection of paired angle and distance readings. As the platform is moved from place to place, the 2D laser scanner 850 continues to return 2D coordinate values. These 2D coordinate values are used to locate the position of the scanner 830 thereby enabling the generation of a two-dimensional map or floorplan of the environment.

Also coupled to the controller 886 is the IMU 874. The IMU 874 is a position/orientation sensor that may include accelerometers 894 (inclinometers), gyroscopes 896, a magnetometer or compass 898, and altimeters. In the exemplary embodiment, the IMU 874 includes multiple accelerometers 894 and gyroscopes 896. The compass 898 indicates a heading based on changes in magnetic field direction relative to the earth's magnetic north. The IMU 874 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 874 determines the pose or orientation of the scanner 108 about three-axis to allow a determination of a yaw, roll and pitch parameter.

In the embodiment shown, the scanner 830 further includes a camera 860 that is a 3D or RGB-D camera. As used herein, the term 3D camera refers to a device that produces a two-dimensional image that includes distances to a point in the environment from the location of scanner 830. The 3D camera 860 may be a range camera or a stereo camera. In an embodiment, the 3D camera 860 includes an RGB-D sensor that combines color information with a per-pixel depth information. In an embodiment, the 3D camera 860 may include an infrared laser projector 831, a left infrared camera 833, a right infrared camera 839, and a color camera 837. In an embodiment, the 3D camera 860 is a RealSense™ camera model R200 manufactured by Intel Corporation.

In an embodiment, when the mobile device 843 is coupled to the housing 832, the mobile device 843 becomes an integral part of the scanner 830. In an embodiment, the mobile device 843 is a cellular phone, a tablet computer or a personal digital assistant (PDA). The mobile device 843 may be coupled for communication via a wired connection, such as ports 801, 802. The port 801 is coupled for communication to the processor 878, such as via I/O controller 890 for example. The ports 801, 802 may be any suitable port, such as but not limited to USB, USB-A, USB-B, USB-C, IEEE 1398 (Firewire), or Lightning™ connectors.

The mobile device 843 is a suitable electronic device capable of accepting data and instructions, executing the instructions to process the data, and presenting the results. The mobile device 843 includes one or more processors 804. The processors 804 may be microprocessors, field programmable gate arrays (FPGAs), digital signal processors (DSPs), and generally any device capable of performing computing functions. The one or more processors 804 have access to memory 806 for storing information.

The mobile device 843 is capable of converting the analog voltage or current level provided by sensors 808 and processor 878. Mobile device 843 uses the digital signals that act as input to various processes for controlling the scanner 830. The digital signals represent one or more platform data including but not limited to distance to an object, images of the environment, acceleration, pitch orientation, yaw orientation, roll orientation, global position, ambient light levels, and altitude for example.

In general, mobile device 843 accepts data from sensors 808 and is given certain instructions for the purpose of generating or assisting the processor 878 in the generation of a two-dimensional map or three-dimensional map of a scanned environment. Mobile device 843 provides operating signals to the processor 878, the sensors 808 and a display 810. Mobile device 843 also accepts data from sensors 808, indicating, for example, to track the position of the mobile device 843 in the environment or measure coordinates of points on surfaces in the environment. The mobile device 843 compares the operational parameters to predetermined variances (e.g. yaw, pitch or roll thresholds) and if the predetermined variance is exceeded, may generate a signal. The data received by the mobile device 843 may be displayed on display 810. In an embodiment, the display 810 is a touch screen device that allows the operator to input data or control the operation of the scanner 830.

The controller 868 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internee) Protocol), RS-232, ModBus, and the like. Additional scanners 830 may also be connected to LAN with the controllers 868 in each of these scanners 830 being configured to send and receive data to and from remote computers and other scanners 830. The LAN may be connected to the Internet. This connection allows controller 868 to communicate with one or more remote computers connected to the Internet.

The processors 804 are coupled to memory 806. The memory 806 may include random access memory (RAM) device, a non-volatile memory (NVM) device, and a read-only memory (ROM) device. In addition, the processors 804 may be connected to one or more input/output (I/O) controllers 812 and a communications circuit 814. In an embodiment, the communications circuit 814 provides an interface that allows wireless or wired communication with one or more external devices or networks, such as the LAN or the cellular network discussed above.

Controller 868 includes operation control methods embodied in application code. These methods are embodied in computer instructions written to be executed by processors 878, 804, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Also coupled to the processor 804 are the sensors 808. The sensors 808 may include but are not limited to: a microphone 816; a speaker 818; a front or rear facing camera 820; accelerometers 822 (inclinometers), gyroscopes 824, a magnetometers or compass 826; a global positioning satellite (GPS) module 828; a barometer 829; a proximity sensor 827; and an ambient light sensor 825. By combining readings from a combination of sensors 808 with a fusion algorithm that may include a Kalman filter, relatively accurate position and orientation measurements can be obtained.

It should be appreciated that the sensors 860, 874 integrated into the scanner 830 may have different characteristics than the sensors 808 of mobile device 843. For example, the resolution of the cameras 860, 820 may be different, or the accelerometers 894, 822 may have different dynamic ranges, frequency response, sensitivity (mV/g) or temperature parameters (sensitivity or range). Similarly, the gyroscopes 896, 824 or compass/magnetometer may have different characteristics. It is anticipated that in some aspects, one or more sensors 808 in the mobile device 843 may be of higher accuracy than the corresponding sensors 874 in the scanner 830. As described in more detail herein, in some aspects the processor 878 determines the characteristics of each of the sensors 808 and compares them with the corresponding sensors in the scanner 830 when the mobile device. The processor 878 then selects which sensors 874, 808 are used during operation. In some aspects, the mobile device 843 may have additional sensors (e.g. microphone 816, camera 820) that may be used to enhance operation compared to operation of the scanner 830 without the mobile device 843. In still further aspects, the scanner 830 does not include the IMU 874 and the processor 878 uses the sensors 808 for tracking the position and orientation/pose of the scanner 830. In still further aspects, the addition of the mobile device 843 allows the scanner 830 to utilize the camera 820 to perform three-dimensional (3D) measurements either directly (using an RGB-D camera) or using photogrammetry techniques to generate 3D maps. In an embodiment, the processor 878 uses the communications circuit (e.g. a cellular 8G internet connection) to transmit and receive data from remote computers or devices.

In an embodiment, the scanner 830 determines a quality attribute/parameter for the tracking of the scanner 830 and/or the platform. In an embodiment, the tracking quality attribute is a confidence level in the determined tracking positions and orientations to actual positions and orientations. When the confidence level crosses a threshold, the scanner 830 may provide feedback to the operator to perform a stationary scan. It should be appreciated that a stationary scan will provide a highly accurate measurements that will allow the determination of the position and orientation of the scanner or platform with a high level of confidence. In an embodiment, the feedback is provided via a user interface. The user interface may be on the scanner 830, or a platform associated with the scanner 830.

In the exemplary embodiment, the scanner 830 is a handheld portable device that is sized and weighted to be carried by a single person during operation. Therefore, the plane 809 in which the 2D laser scanner 850 projects a light beam may not be horizontal relative to the floor or may continuously change as the computer moves during the scanning process. Thus, the signals generated by the accelerometers 894, gyroscopes 896 and compass 898 (or the corresponding sensors 808) may be used to determine the pose (yaw, roll, tilt) of the scanner 108 and determine the orientation of the plane 851.

In an embodiment, it may be desired to maintain the pose of the scanner 830 (and thus the plane 809) within predetermined thresholds relative to the yaw, roll and pitch orientations of the scanner 830. In an embodiment, a haptic feedback device 877 is disposed within the housing 832, such as in the handle 836. The haptic feedback device 877 is a device that creates a force, vibration or motion that is felt or heard by the operator. The haptic feedback device 877 may be, but is not limited to: an eccentric rotating mass vibration motor or a linear resonant actuator for example. The haptic feedback device is used to alert the operator that the orientation of the light beam from 2D laser scanner 850 is equal to or beyond a predetermined threshold. In operation, when the IMU 874 measures an angle (yaw, roll, pitch or a combination thereof), the controller 868 transmits a signal to a motor controller 838 that activates a vibration motor 845. Since the vibration originates in the handle 836, the operator will be notified of the deviation in the orientation of the scanner 830. The vibration continues until the scanner 830 is oriented within the predetermined threshold or the operator releases the actuator 838. In an embodiment, it is desired for the plane 809 to be within 10-15 degrees of horizontal (relative to the ground) about the yaw, roll and pitch axes.

Figure 8:
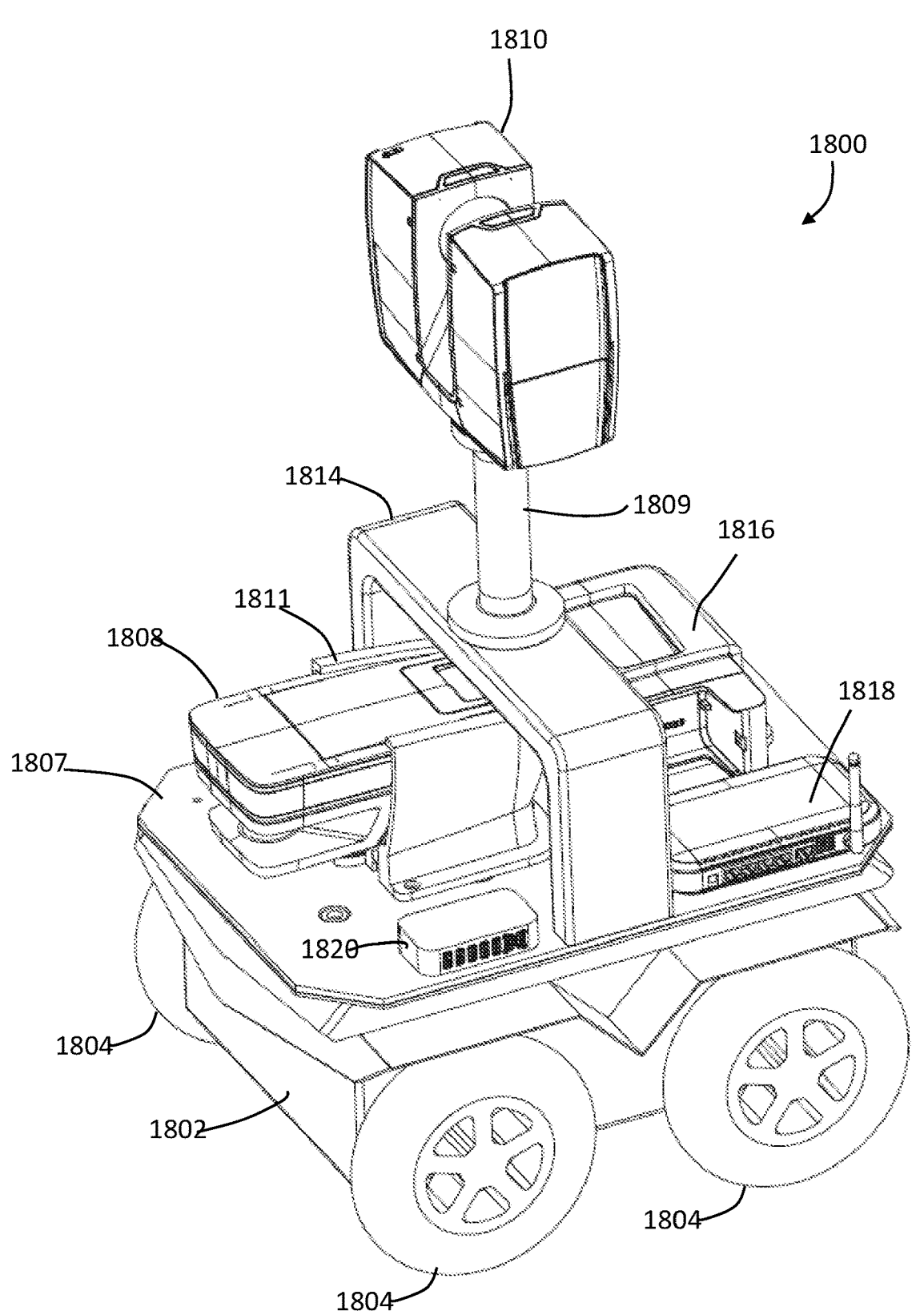
FIGS. 8-10 depict an embodiment of a mobile scanning
platform.
Figure 9:
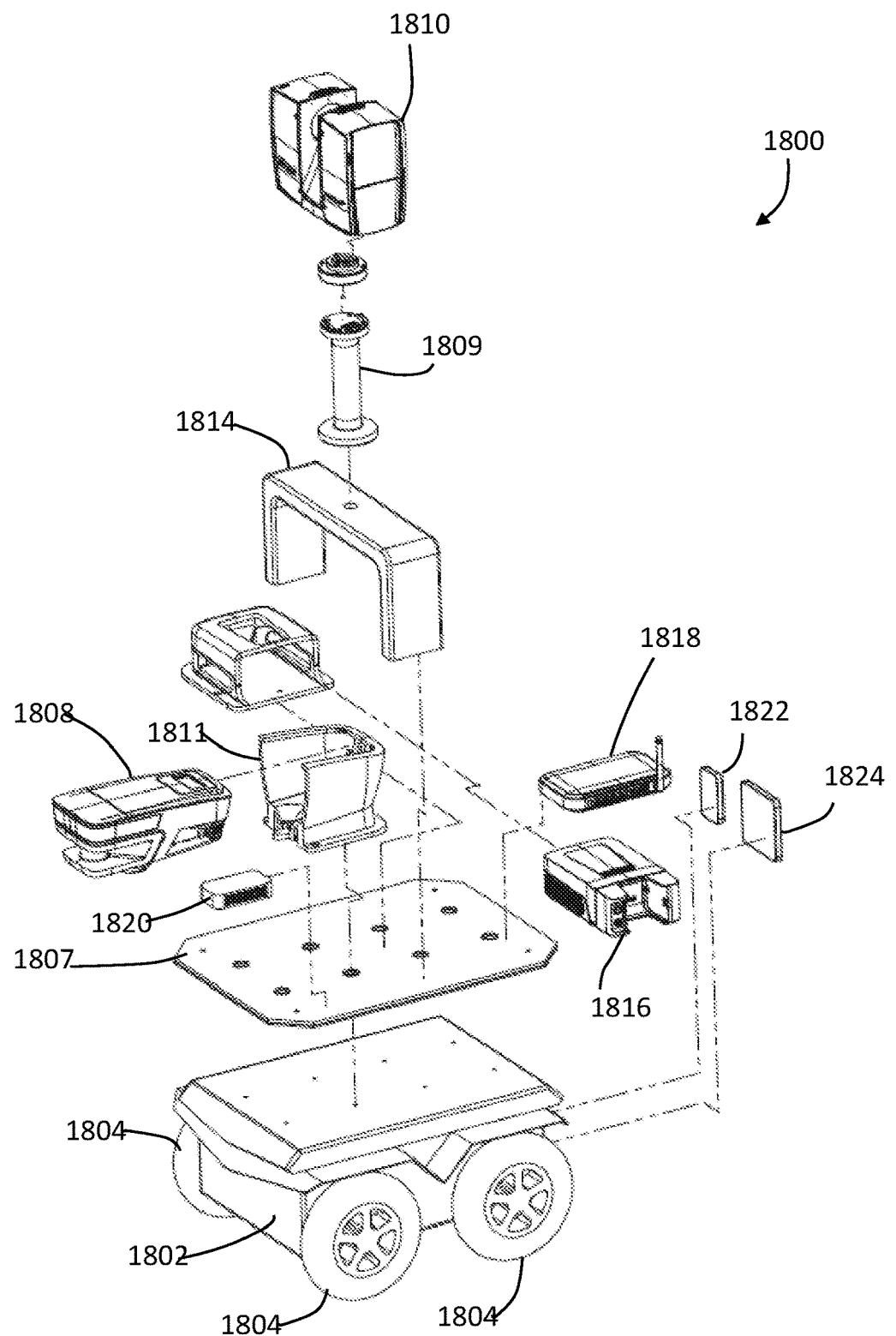
Figure 10:
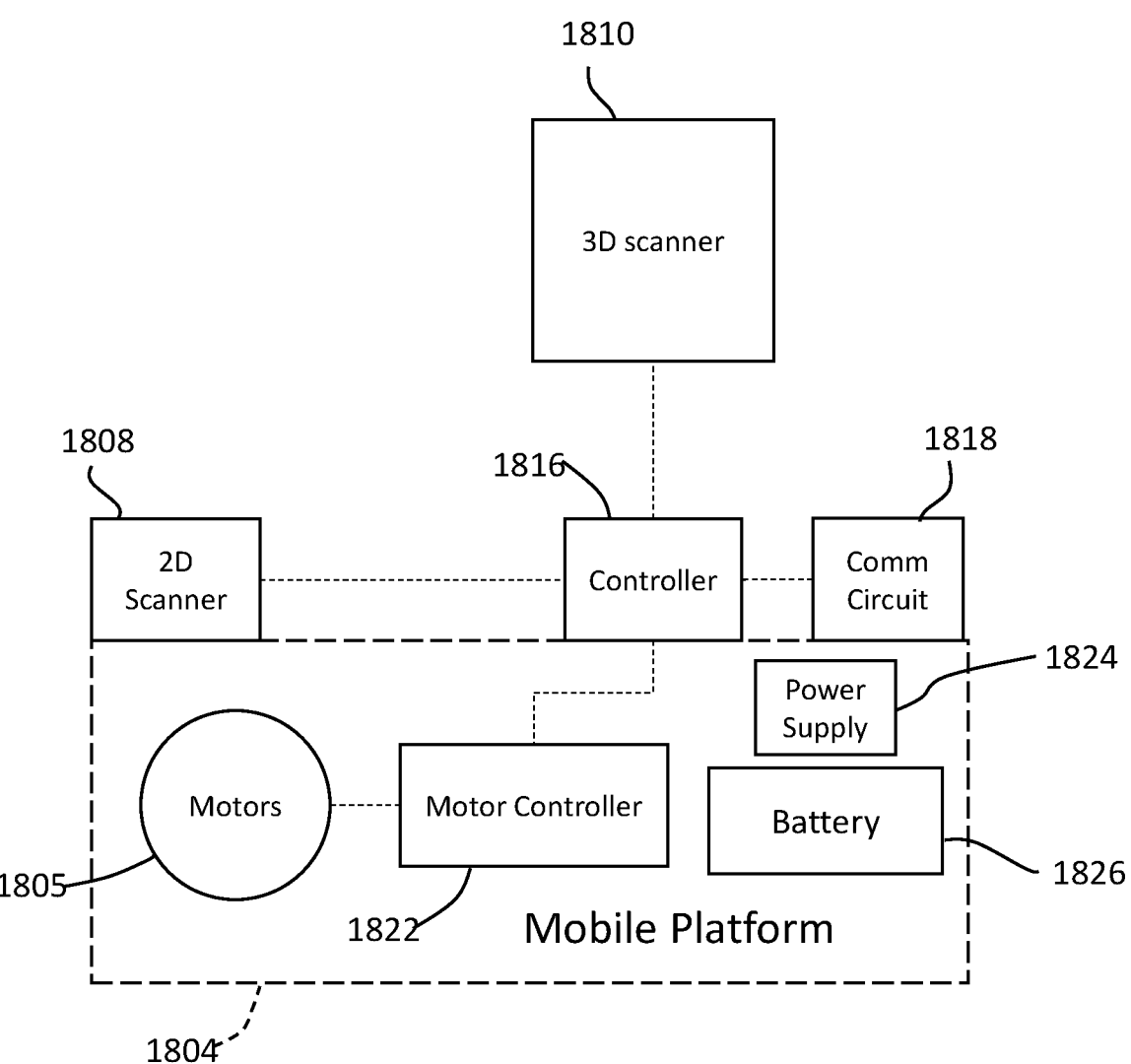

Referring now to FIGS. 8-10, an embodiment is shown of a mobile scanning platform 1800. The mobile scanning platform 1800 can be used as the scanner 120. The mobile scanning platform 1800 includes a base unit 1802 having a plurality of wheels 1804. The wheels 1804 are rotated by motors 1805. In an embodiment, an adapter plate 1807 is coupled to the base unit 1802 to allow components and modules to be coupled to the base unit 1802. The mobile scanning platform 1800 further includes a 2D scanner 1808 and a 3D scanner 1810. In the illustrated embodiment, each scanner 1808, 1810 is removably coupled to the adapter plate 1806. The 2D scanner 1808 may be the scanner illustrated and described herein. As will be described in more detail herein, in some aspects the 2D scanner 1808 is removable from the adapter plate 1806 and is used to generate a map of the environment, plan a path for the mobile scanning platform to follow, and define 3D scanning locations. In the illustrated embodiment, the 2D scanner 1808 is slidably coupled to a bracket 1811 that couples the 2D scanner 1808 to the adapter plate 1807.

In an embodiment, the 3D scanner 1810 is a time-of-flight (TOF) laser scanner such as that shown and described herein. The scanner 1810 may be that described in commonly owned U.S. Pat. No. 8,705,012, which is incorporated by reference herein. In an embodiment, the 3D scanner 1810 mounted on a pedestal or post 1809 that elevates the 3D scanner 1810 above (e.g. further from the floor than) the other components in the mobile scanning platform 1800 so that the emission and receipt of the light beam is not interfered with. In the illustrated embodiment, the pedestal 1809 is coupled to the adapter plate 1807 by a u-shaped frame 1814.

In an embodiment, the mobile scanning platform 1800 further includes a controller 1816. The controller 1816 is a computing device having one or more processors and memory. The one or more processors are responsive to non-transitory executable computer instructions for performing operational methods such as those described herein. The processors may be microprocessors, field programmable gate arrays (FPGAs), digital signal processors (DSPs), and generally any device capable of performing computing functions. The one or more processors have access to memory for storing information.

Coupled for communication to the controller 1816 is a communications circuit 1818 and an input/output hub 1820. In the illustrated embodiment, the communications circuit 1818 is configured to transmit and receive data via a wireless radio-frequency communications medium, such as WIFI or Bluetooth for example. In an embodiment, the 2D scanner 1808 communicates with the controller 1816 via the communications circuit 1818

In an embodiment, the mobile scanning platform 1800 further includes a motor controller 1822 that is operably coupled to the control the motors 1805. In an embodiment, the motor controller 1822 is mounted to an external surface of the base unit 1802. In another embodiment, the motor controller 1822 is arranged internally within the base unit 1802. The mobile scanning platform 1800 further includes a power supply 1824 that controls the flow of electrical power from a power source, such as batteries 1826 for example. The batteries 1826 may be disposed within the interior of the base unit 1802. In an embodiment, the base unit 1802 includes a port (not shown) for coupling the power supply to an external power source for recharging the batteries 1826. In another embodiment, the batteries 1826 are removable or replaceable.

Figure 12:
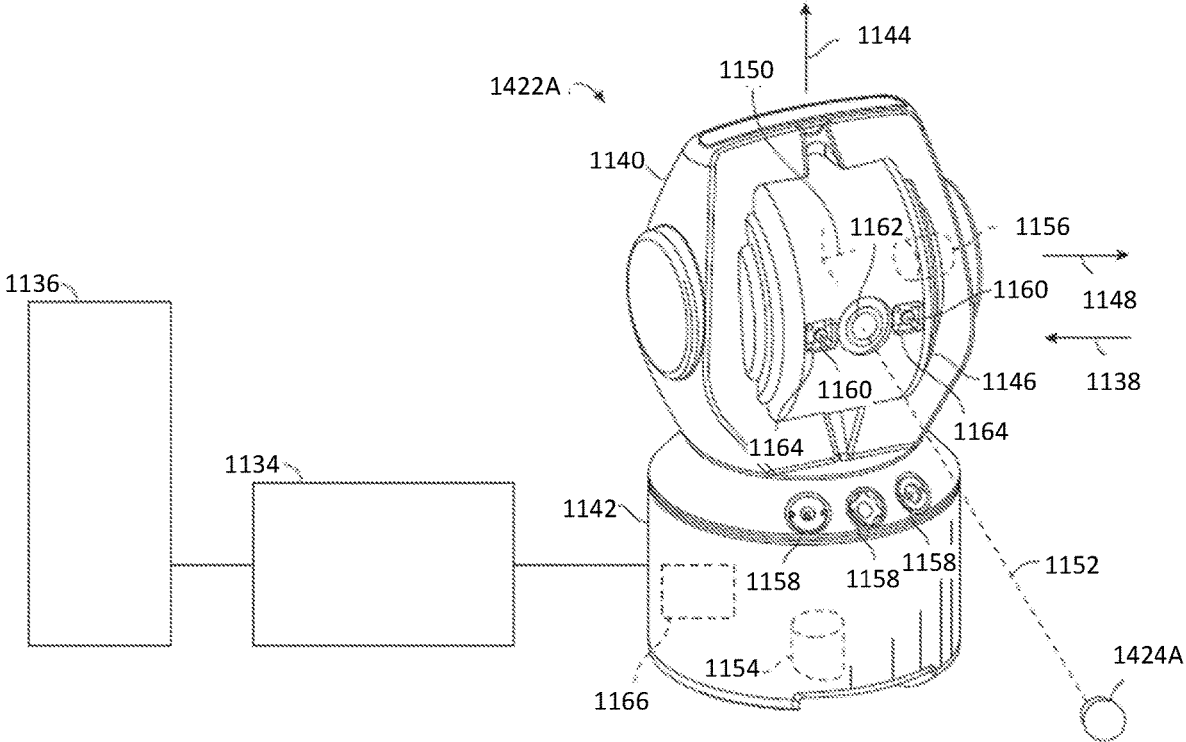
Figure 13:
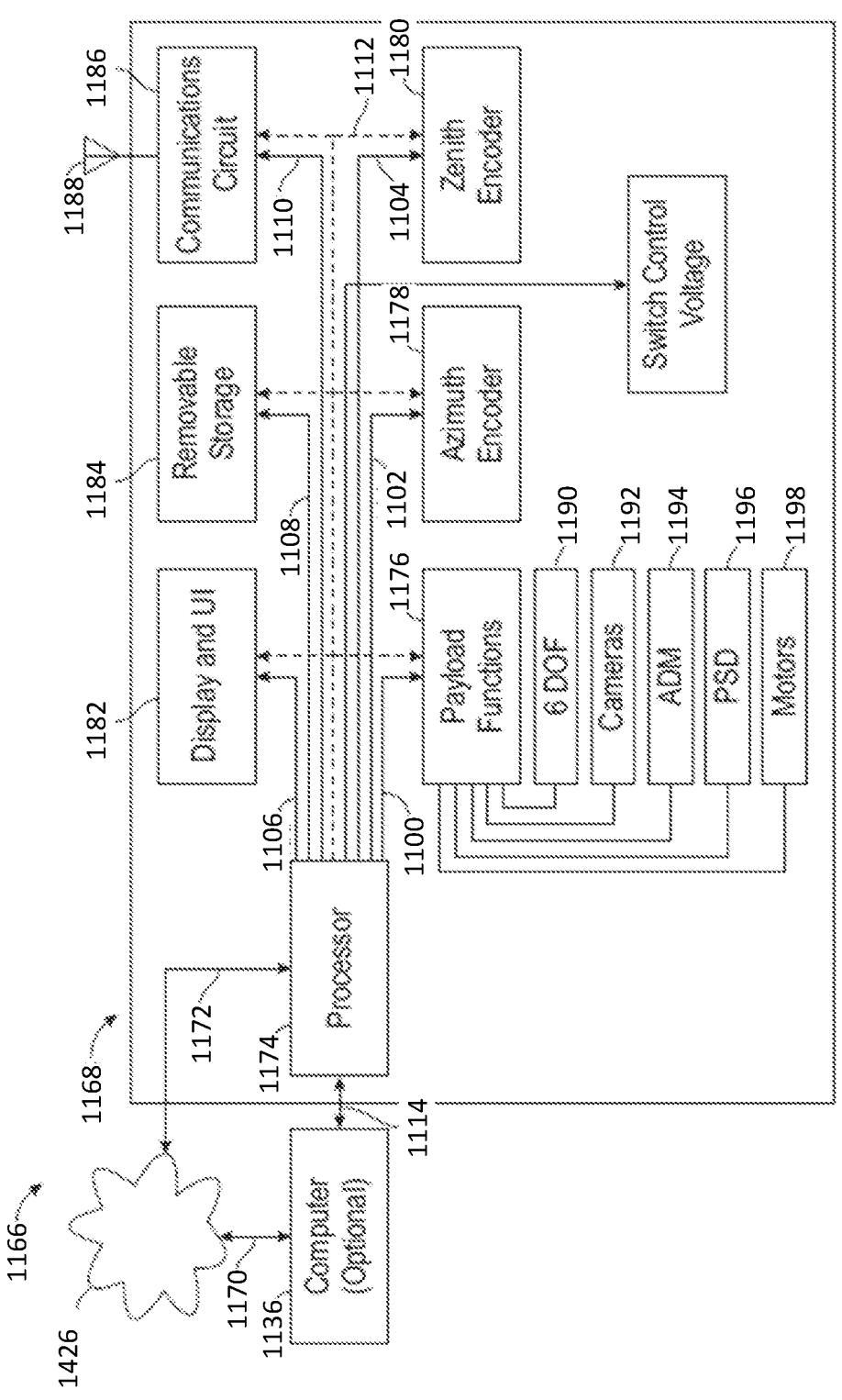

Referring now to FIGS. 11-13, an embodiment of the laser tracker device 1422A will be described. In some aspects, one or more of the laser tracker devices 1422A-1422E may be constructed in a manner similar to those described in commonly owned U.S. Pat. Nos. 8,558,992, 8,537,376, 8,724, 120, and 7,583,375, the contents of which are incorporated by reference herein. In an embodiment, the laser tracker device 1422A includes an optional auxiliary unit processor 1134, and an optional auxiliary computer 1136. In an embodiment, one or both of the auxiliary unit processor 1134 or the auxiliary computer 1136 may be a node, such as node 1428 for example, on the computer network 1426. An exemplary gimbaled beam-steering mechanism 38 of laser tracker device 1422A comprises a zenith carriage 1140 mounted on an azimuth base 1142 and rotated about an azimuth axis 1144. A payload 1146 is mounted on the zenith carriage 1140 and rotated about a zenith axis 1148. Zenith axis 1148 and azimuth axis 1144 intersect orthogonally, internally to laser tracker device 1422A, at gimbal point 1150, which is typically the origin for distance measurements. A light beam 1152 virtually passes through the gimbal point 1150 and is pointed orthogonal to zenith axis 1148. In other words, laser beam 1152 lies in a plane approximately perpendicular to the zenith axis 1148 and that passes through the azimuth axis 1144. Outgoing laser beam 1152 is pointed in the desired direction by rotation of payload 1146 about zenith axis 1148 and by rotation of zenith carriage 1140 about azimuth axis 1144.

In an embodiment, the payload 1146 is rotated about the azimuth axis 1144 and zenith axis 1148 by motors 1154, 1156 respectively. The motors 1154, 1156 may be located internal to the laser tracker device 1422A and are aligned with the mechanical axes 1144, 1148. A zenith angular encoder, internal to the laser tracker device 1422A, is attached to a zenith mechanical axis aligned to the zenith axis 1148. An azimuth angular encoder, internal to the tracker, is attached to an azimuth mechanical axis aligned to the azimuth axis 1144. The zenith and azimuth angular encoders measure the zenith and azimuth angles of rotation to relatively high accuracy. Outgoing laser beam 1152 travels to a retroreflector target, such as retroreflective target 1424A for example. In an embodiment, the retroreflective target may be a spherically mounted retroreflector (SMR) for example. By measuring the radial distance between gimbal point 1150 and retroreflective target 1424A, the rotation angle about the zenith axis 1148, and the rotation angle about the azimuth axis 1144, the position of retroreflective target 1424A may be found within the spherical coordinate system of the laser tracker device 1422A.

Outgoing light beam 1152 may include one or more wavelengths. For the sake of clarity and simplicity, a steering mechanism of the sort shown in FIG. 11 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 1158 may be included on the laser tracker for resetting the laser tracker to a "home" position for different sized SMRs—for example, 1.5, 7⁄8, and 1⁄2 inch SMRs. In addition, an on-tracker mirror, not visible from the view of FIG. 11, may be used in combination with the on-tracker retroreflector to enable performance of a self-compensation.

As will be discussed in more detail herein, one or more target cameras 1160 may be disposed on the payload 1146 adjacent the aperture 1162 from which the light beam 1152 is emitted. In an embodiment, the cameras 1160 enable the user to view the environment in the direction of the laser tracker device 1422A via the display on the mobile computing device 30. In an embodiment, the laser tracker device 1422A may also have one or more light sources 1164 located on the payload 1146 adjacent the cameras 1160. As will be discussed in more detail herein, the light sources 1164 may be selectively activated on a periodic or aperiodic basis to emit light into the environment to assist in the identification of retroreflective targets 1424A-1424D.

FIG. 12 is a block diagram depicting a dimensional measurement electronics processing system 1166 that includes a laser tracker electronics processing system 1168 and computer 1136. The processing system 1168 may be connected to the computer network 1426 via computer 1136 and communications medium 1170 or directly via a communication medium 1172. Exemplary laser tracker electronics processing system 1168 includes one or more processors 1174, payload functions electronics 1176, azimuth encoder electronics 1178, zenith encoder electronics 1180, display and user interface (UI) electronics 1182, removable storage hardware 1184, communications circuit 1186 electronics, and in an embodiment an antenna 1188. The payload functions electronics 1176 includes a number of subfunctions including the six-DOF electronics 1190, the camera electronics 1192, the absolute distance meter (ADM) electronics 1194, the position detector (PSD) electronics 1196, and motor controller electronics 1198. Most of the subfunctions have at least one processor unit, which might be a digital signal processor (DSP) or field programmable gate array (FPGA), for example. In an embodiment, the payload functions 1176 are located in the payload 1146. In some aspects, the azimuth encoder electronics 1178 are located in the azimuth assembly and the zenith encoder electronics 1180 are located in the zenith assembly.

As used herein, when a reference is made to one or more processors of the laser tracker device 1422A, it is meant to include possible external computer and cloud support.

In an embodiment, a separate communications bus goes from the processor 1174 to each of the electronics units 1176, 1178, 1180, 1182, 1184, and 1186. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the processor 1174 sends packets of information over bus 1100 to payload functions electronics 1176, over bus 1102 to azimuth encoder electronics 1178, over bus 1104 to zenith encoder electronics 1180, over bus 1106 to display and UI electronics 1182, over bus 1108 to removable storage hardware 1184, and over bus 1110 to communications circuit 1186.

In an embodiment, processor 1174 also sends a synch (synchronization) pulse over the synch bus 1112 to each of the electronics units at the same time. The synch pulse provides a way of synchronizing values collected by the measurement functions of the laser tracker. For example, the azimuth encoder electronics 1178 and the zenith electronics 1180 latch their encoder values as soon as the synch pulse is received. Similarly, the payload functions electronics 1176 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

In an embodiment, the azimuth encoder electronics 1178 and zenith encoder electronics 1180 are separated from one another and from the payload functions 1176 by slip rings, which are electromechanical devices that allow the transmission of electrical power and electrical signals from a stationary to a rotating structure, and vice versa. For this reason, the bus lines 1100, 1102, and 1104 are depicted as separate bus lines.

The laser tracker electronics processing system 1168 may communicate with an external computer 1136, or it may provide computation, display, and UI functions within the laser tracker. The laser tracker communicates with computer 1136 over communications link 114, which might be, for example, an Ethernet line or a wireless connection. The laser tracker may also communicate with other elements such as node 1428, via computer network 1426, through communications medium 1172, which might include one or more electrical cables, such as Ethernet cables, and one or more wireless connections. It should be appreciated that while FIG. 12 illustrates the communications medium 1172 as extending from the computer network 1426 directly to the processor 1174, signals may be transmitted and received via the communications circuit 1186. As discussed in more detail herein, a user having the mobile computing device 30 may have a connection to the computer network 1426 over an Ethernet or wireless communications medium, which in turn connects to the processor 1174 over an Ethernet or wireless communications medium. In this way, a user may control the functions of a remote laser tracker.

In an embodiment, a laser tracker may use one visible wavelength (usually red) and one infrared wavelength for the ADM. The red wavelength may be provided by a frequency stabilized helium-neon (HeNe) laser suitable for use in an interferometer and also for use in providing a red pointer beam. In other aspects, the red wavelength may be provided by a diode laser that serves just as a pointer beam. In another embodiment, a laser tracker uses a single visible wavelength (for example, red) for both the ADM and the pointer beam.

Figure 14:
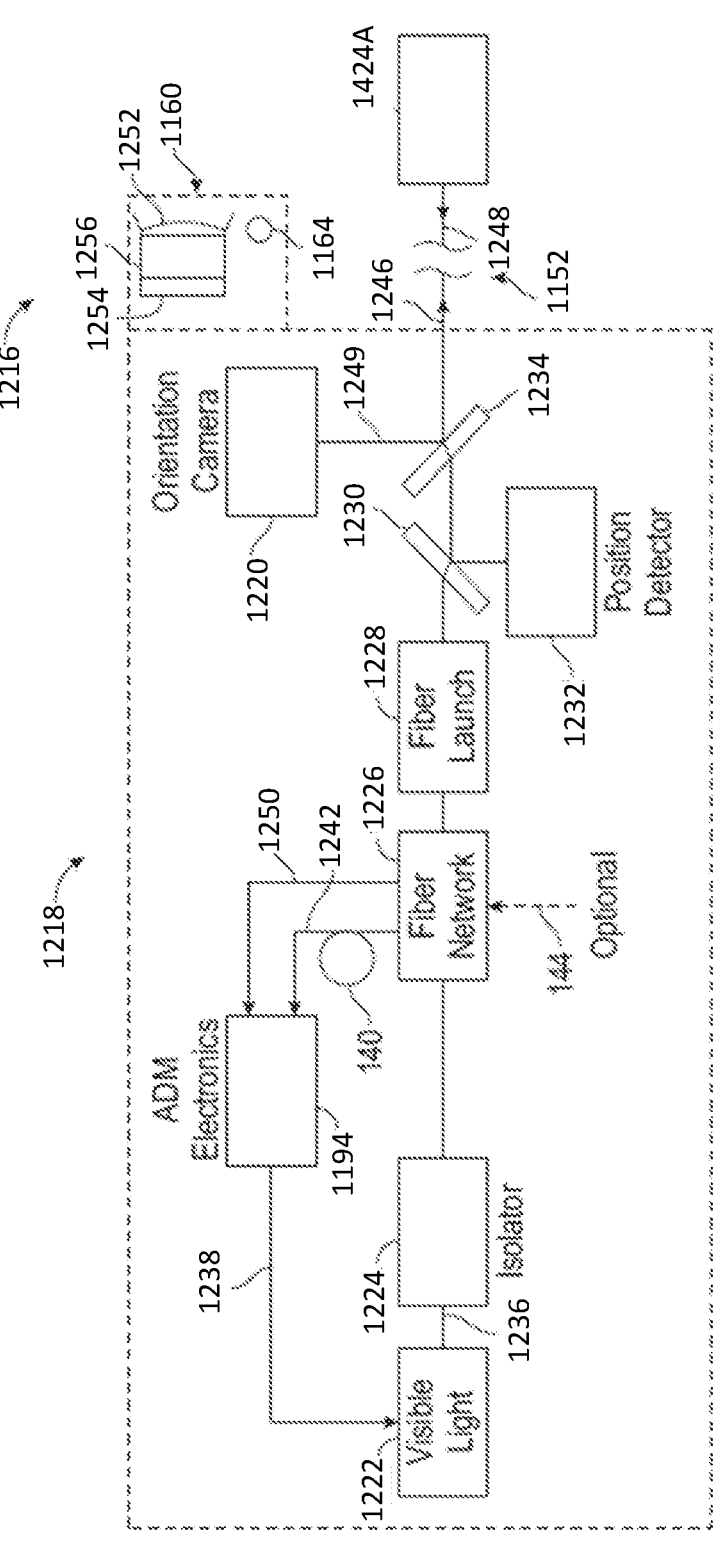
FIG. 14 shows a block diagram of elements of a laser
tracker device.

FIG. 14 shows an embodiment of a laser tracker device having a target camera system 1116 and an optoelectronic system 1118 in which an optional orientation camera 1220 is combined with the optoelectronic functionality of a 3D laser tracker to measure the distance to the retroreflective target 1424A. In an embodiment, the optoelectronic system 1118 includes a visible light source 1222, an isolator 1224, ADM electronics 1194, a fiber network 1226, a fiber launch 1228, a beam splitter 1230, a position detector 1232, a beam splitter 1234, and an optional orientation camera 1220. The light from the visible light source 1222 is emitted in optical fiber 1236 and travels through isolator 1224, which may have optical fibers coupled on the input and output ports. The ADM electronics 1194 sends an electrical signal over connection 1238 to modulate the visible light source 1222. Some of the light entering the fiber network travels through the fiber length equalizer 1240 and the optical fiber 1242 to enter the reference channel of the ADM electronics 1194. An electrical signal 1244 may optionally be applied to the fiber network 1226 to provide a switching signal to a fiber optic switch within the fiber network 1226. A part of the light travels from the fiber network to the fiber launch 1228, which sends the light on the optical fiber into free space as light beam 1246. A small amount of the light reflects off the beam splitter 1230 and is lost. A portion of the light passes through the beam splitter 1230, through the beam splitter 1234, and travels out of the tracker to retroreflective target 1424A.

On its return path, the light 1248 from the retroreflective target 1424A enters the optoelectronic system 1118 and arrives at beam splitter 1234. Part of the light is reflected off the beam splitter 1234 and enters the optional orientation camera 1220. The optional orientation camera 1220 records an image of the light 1249, which is evaluated by a processor to determine three orientational degrees-of-freedom of the retroreflector target 1424A. A portion of the light at beam splitter 1230 travels through the beam splitter and is put onto an optical fiber by the fiber launch 1228. The light travels to fiber network 1226. Part of this light travels to optical fiber 1250, from which it enters the measure channel of the ADM electronics 1194.

The target camera system 1116 includes one or more cameras 1160, each having one or more light sources 1164. The target camera system 1116 is also shown in FIG. 11. The camera 1160 includes a lens system 1252, a photosensitive array 1254, and a body 1256. One use of the target camera system 1116 is to locate retroreflector targets in the work volume. In an embodiment, each target camera does this by flashing the light source 1164, which the camera 1160 picks up as a bright spot on the photosensitive array 1254. As will be discussed in more detail herein, the system 20 is configured to determine and identify retroreflective targets based on the light from light source 1164. The system 20 is further configured to evaluate the images captured by the cameras 1160 to distinguish light reflected by the retroreflective targets from other sources of light. Further, the image acquired by camera 1160 may also be transmitted to the mobile computing device where the user may interact with the laser tracker device, such as by reorienting the position of the payload using the image. It should be appreciated that while aspects herein may refer to "an image", this is for exemplary purposes and the claims should not be so narrowly construed as to require a single image. In some aspects, the camera 1160 acquires a video image (e.g. 30 frames per second).

It should be appreciated that the optoelectronic system 1118 illustrated in FIG. 13 is exemplary and not intended to be limiting. In other aspects, the optoelectronic system may include additional or fewer components. For example, in some aspects, the optoelectronic system may include an interferometer for example. The interferometer may be in place of the ADM 1194 or used in combination with the ADM 1194. In other aspects, the optoelectronic system 1118 may not include the orientation camera 1220.

Figure 15:
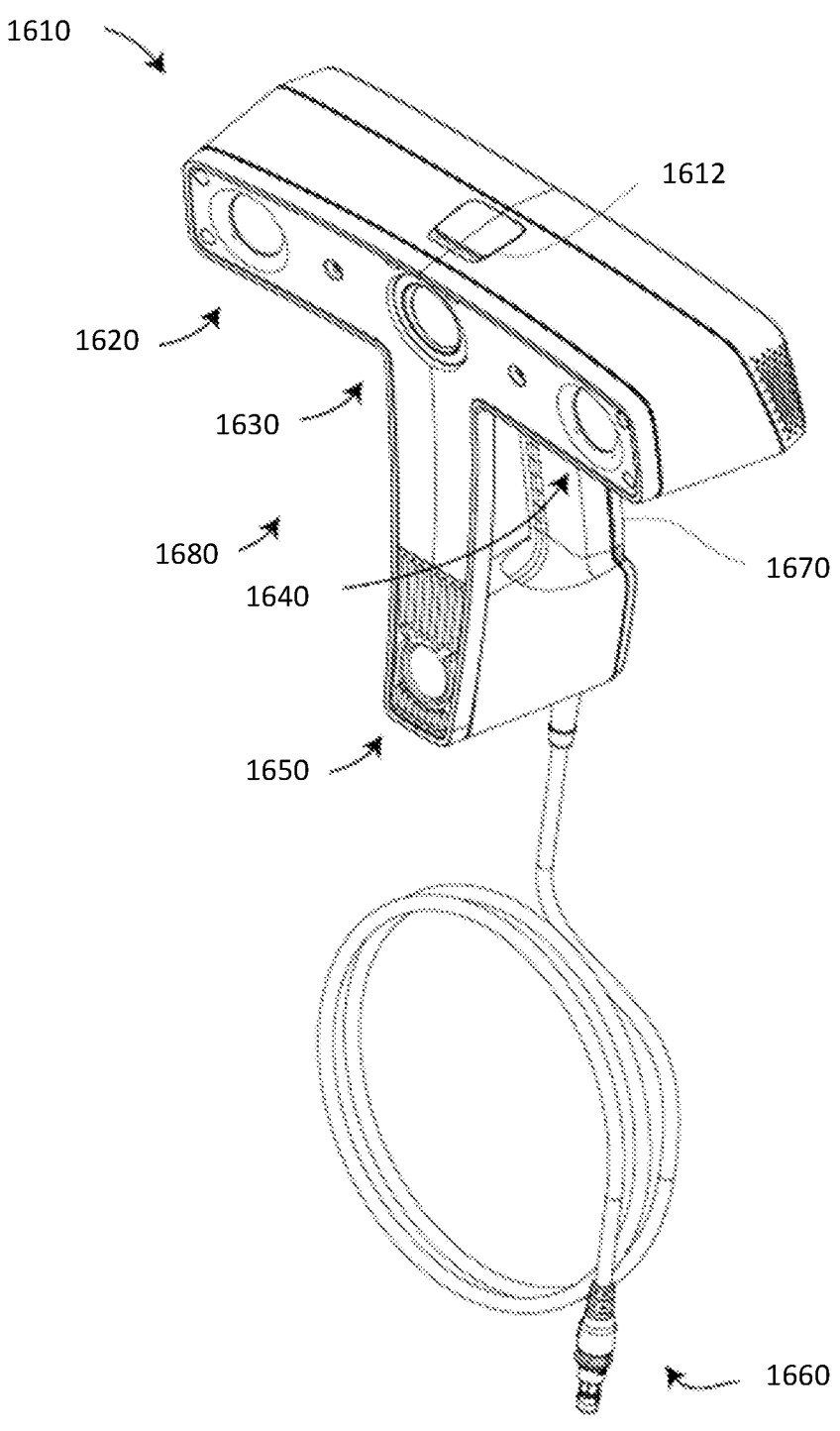
FIGS. 15, 16, 17A, and 17B depict a handheld 3D imager
and a block diagram thereof.
Figure 16:
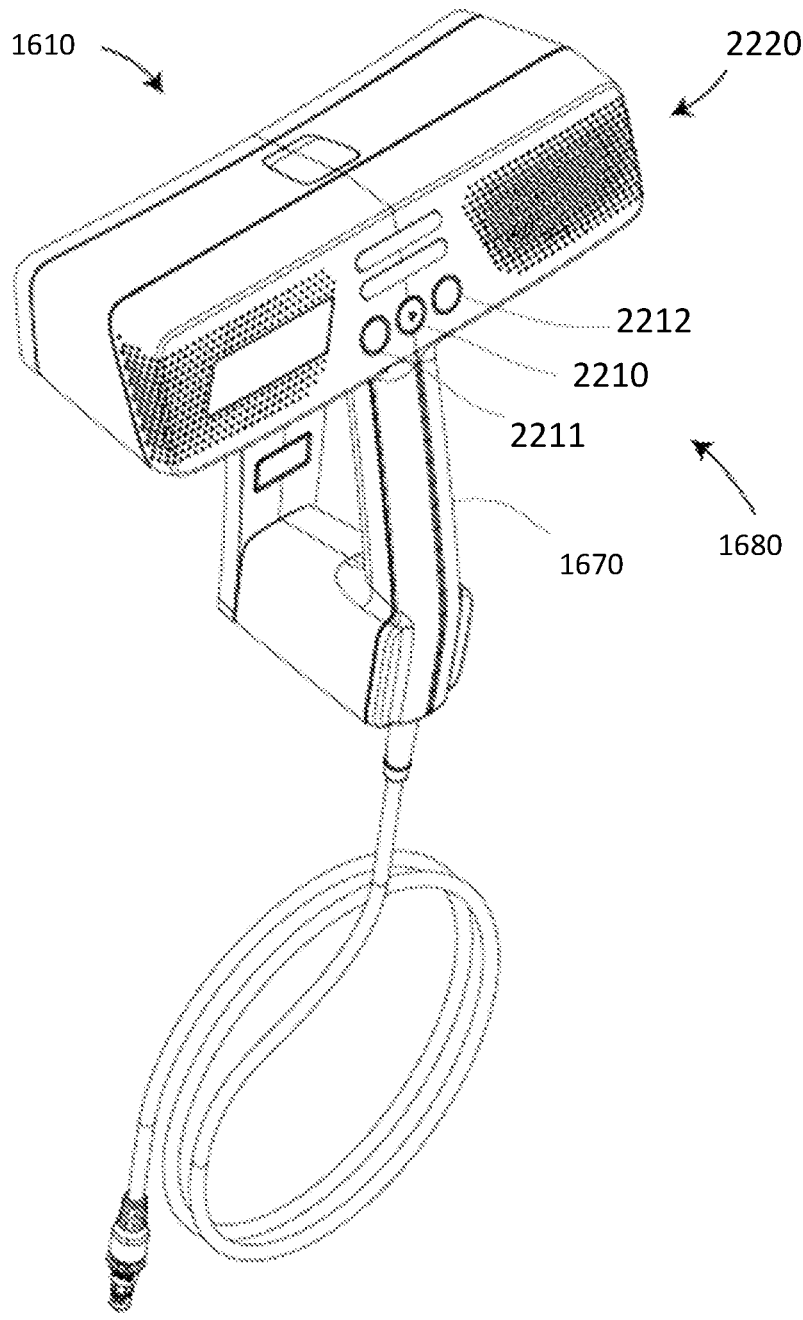

FIGS. 15, 16, 17A, and 17B depict a handheld 3D imager. FIG. 15 is a front isometric view of a handheld 3D triangulation scanner 1610, also referred to as a handheld 3D imager. In an embodiment, the scanner 1610 includes a first infrared (IR) camera 1620, a second IR camera 1640, a registration camera 1630, a projector 1650, an Ethernet cable 1660 and a handle 1670. In an embodiment, the registration camera 1630 is a color camera. Ethernet is a family of computer networking technologies standardized under IEEE 802.3. The enclosure 1680 includes the outmost enclosing elements of the scanner 1610, as explained in more detail herein below. FIG. 16 is a rear perspective view of the scanner 1610 further showing an exemplary perforated rear cover 2220 and a scan start/stop button 2210. In an embodiment, buttons 2211, 2212 may be programmed to perform functions according to the instructions of a computer program, the computer program either stored internally within the scanner 1610 or externally in an external computer. In an embodiment, each of the buttons 2210, 2211, 2212 includes at its periphery a ring illuminated by a light emitting diode (LED).

In an embodiment, the scanner 1610 of FIG. 15 is the scanner described in commonly owned U.S. patent application Ser. No. 16/806,548 filed on Mar. 2, 2020, the contents of which are incorporated by reference herein in its entirety.

Figure 17A:
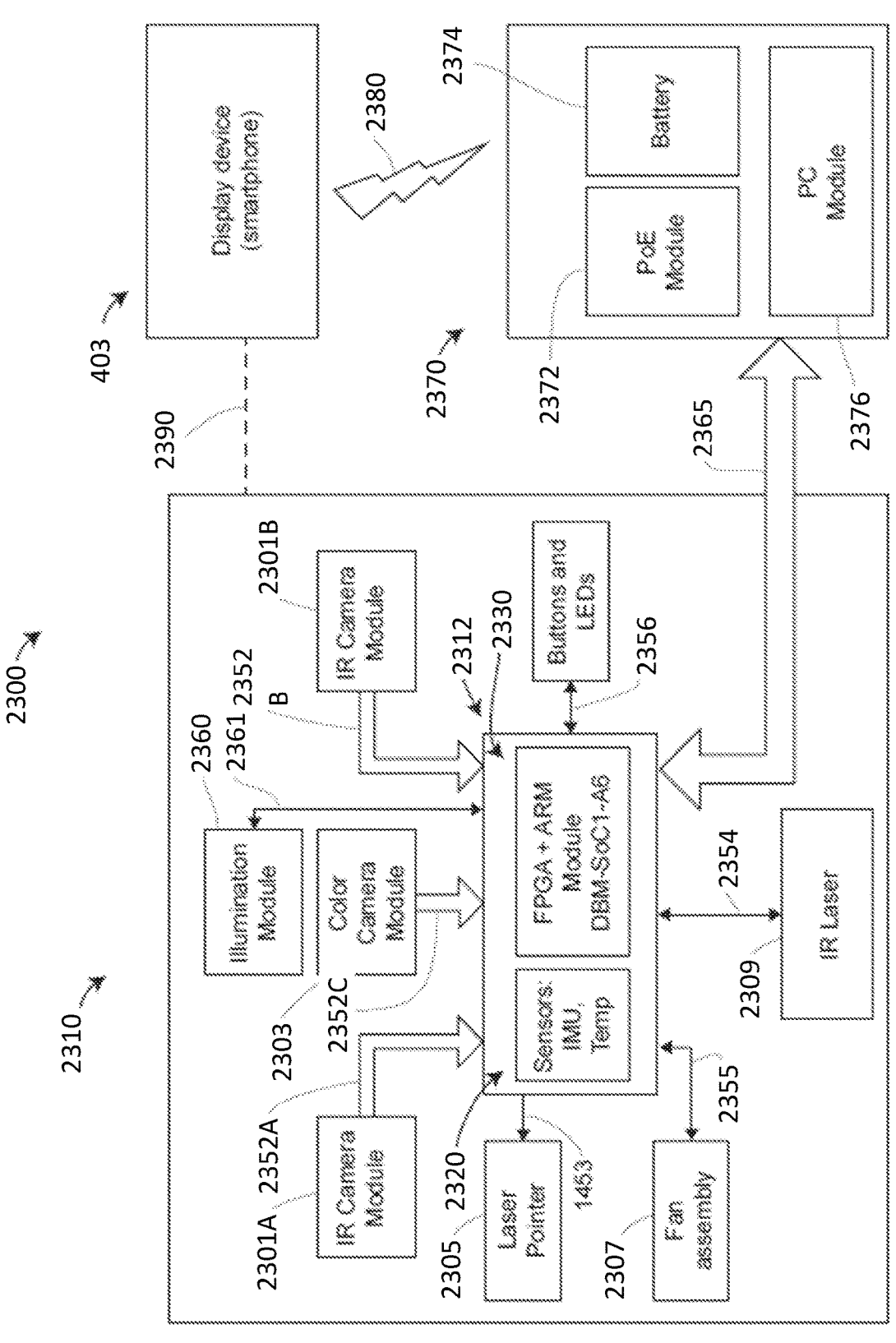
Figure 17B:
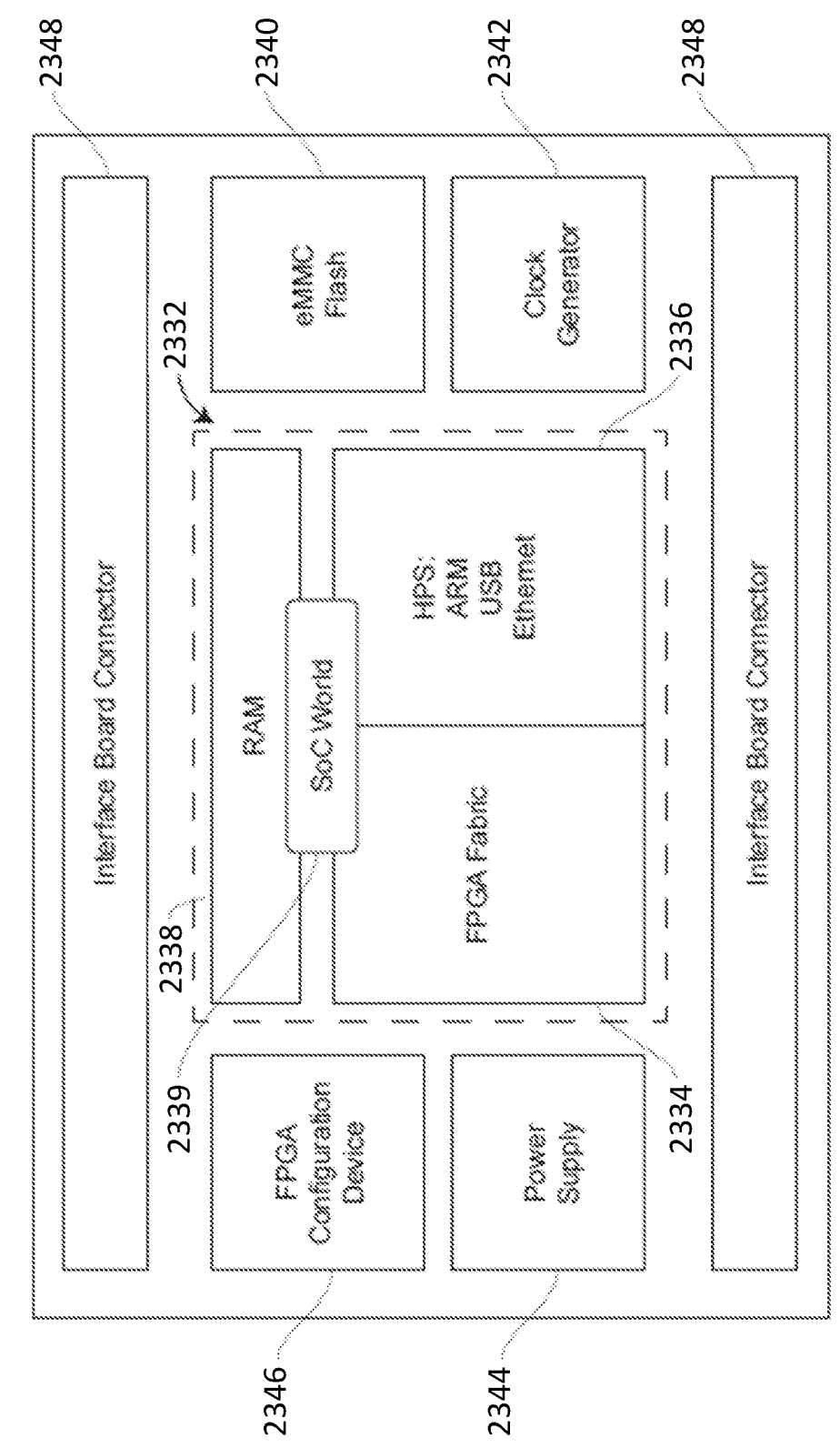

FIG. 17A is a block diagram of system electronics 2300 that in an embodiment is included in the scanner system 10. In an embodiment, the electronics 2300 includes electronics 2310 within the handheld scanner 1610, electronics 2370 within the computing device 110, electronics within the mobile computing device 403, electronics within other electronic devices such as accessories that attach to an accessory interface (not shown), and electronics such as external computers that cooperate with the scanner system electronics 2300. In an embodiment, the electronics 2310 includes a circuit baseboard 2312 that includes a sensor collection 2320 and a computing module 2330, which is further shown in FIG. 17B. In an embodiment, the sensor collection 2320 includes an IMU and one or more temperature sensors. In an embodiment, the computing module 2330 includes a system-on-a-chip (SoC) field programmable gate array (FPGA) 2332. In an embodiment, the SoC FPGA 2332 is a Cyclone V SoC FPGA that includes dual 800 MHz Cortex A9 cores, which are Advanced RISC Machine (ARM) devices. The Cyclone V SoC FPGA is manufactured by Intel Corporation, with headquarters in Santa Clara, California. FIG. 17B represents the SoC FPGA 2332 in block diagram form as including FPGA fabric 2334, a Hard Processor System (HPS) 2336, and random access memory (RAM) 2338 tied together in the SoC 2339. In an embodiment, the HPS 2336 provides peripheral functions such as Gigabit Ethernet and USB. In an embodiment, the computing module 2330 further includes an embedded MultiMedia Card (eMMC) 2340 having flash memory, a clock generator 2342, a power supply 2344, an FPGA configuration device 2346, and interface board connectors 2348 for electrical communication with the rest of the system.

Signals from the infrared (IR) cameras 2301A, 2301B and the registration camera 2303 are fed from camera boards through cables to the circuit baseboard 2312. Image signals 2352A, 2352B, 2352C from the cables are processed by the computing module 2330. In an embodiment, the computing module 2330 provides a signal 2353 that initiates emission of light from the laser pointer 2305. A TE control circuit communicates with the TE cooler within the infrared laser 2309 through a bidirectional signal line 2354. In an embodiment, the TE control circuit is included within the SoC FPGA 2332. In another embodiment, the TE control circuit is a separate circuit on the baseboard 2312. A control line 2355 sends a signal to the fan assembly 2307 to set the speed of the fans. In an embodiment, the controlled speed is based at least in part on the temperature as measured by temperature sensors within the sensor unit 2320. In an embodiment, the baseboard 2312 receives and sends signals to buttons 2210, 2211, 2212 and their LEDs through the signal line 2356. In an embodiment, the baseboard 2312 sends over a line 2361 a signal to an illumination module 2360 that causes white light from the LEDs to be turned on or off.

In an embodiment, bidirectional communication between the electronics 2310 and the electronics 2370 is enabled by Ethernet communications link 2365. In an embodiment, the Ethernet link is provided by the cable 1660. In an embodiment, the cable 1660 attaches to the mobile PC 401 through the connector on the bottom of the handle. The Ethernet communications link 2365 is further operable to provide or transfer power to the electronics 2310 through the user of a custom Power over Ethernet (PoE) module 2372 coupled to the battery 2374. In an embodiment, the mobile PC 2370 further includes a PC module 2376, which in an embodiment is an Intel® Next Unit of Computing (NUC) processor. The NUC is manufactured by Intel Corporation, with headquarters in Santa Clara, California. In an embodiment, the mobile PC 2370 is configured to be portable, such as by attaching to a belt and carried around the waist or shoulder of an operator.

It should be appreciated that the examples of measurement tools depicted herein can further be attached an external camera to capture the identity images 310, in addition to any of the cameras that are already associated with the measurement tools.

Terms such as processor, controller, computer, DSP, FPGA are understood in this document to mean a computing device that may be located within an instrument, distributed in multiple elements throughout an instrument, or placed external to an instrument.

Figure 18:
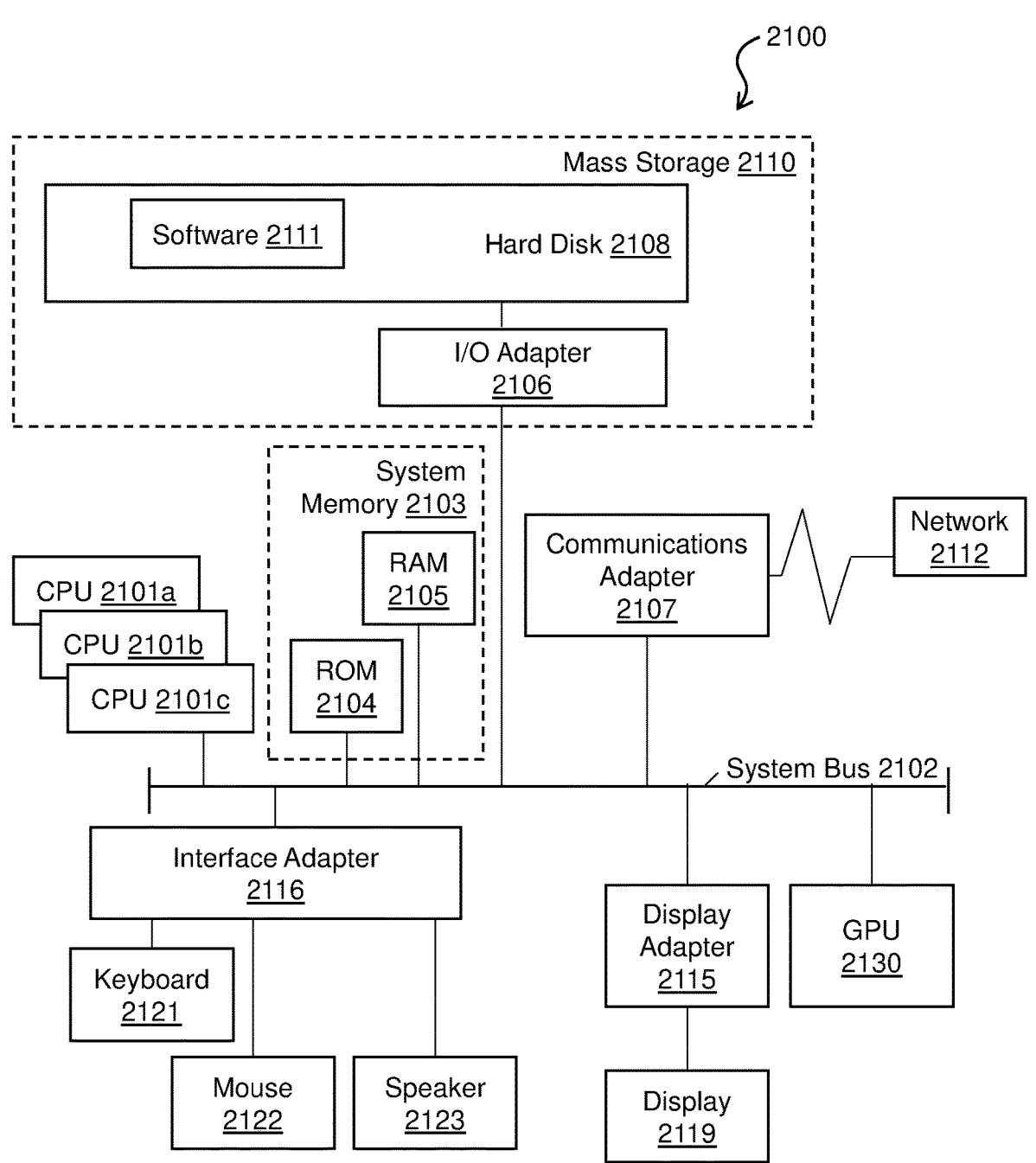
FIG. 18 depicts a computer system according to one or
more aspects.

Turning now to FIG. 18, a computer system 2100 is generally shown in accordance with an embodiment. The computer system 2100 can be used as the computing device 110 and/or the computing device 150. The computer system 2100 can be an electronic, computer framework comprising and/or employing any number and combination of computing devices and networks utilizing various communication technologies, as described herein. The computer system 2100 can be easily scalable, extensible, and modular, with the ability to change to different services or reconfigure some features independently of others. The computer system 2100 may be, for example, a server, desktop computer, laptop computer, tablet computer, or smartphone. In some examples, computer system 2100 may be a cloud computing node. Computer system 2100 may be described in the general context of computer system executable instructions, such as program modules, being executed by a computer system. Generally, program modules may include routines, programs, objects, components, logic, data structures, and so on that perform particular tasks or implement particular abstract data types. Computer system 2100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 18, the computer system 2100 has one or more central processing units (CPU(s)) 2101*a*, 2101*b*, 2101*c*, etc. (collectively or generically referred to as processor(s) 2101). The processors 2101 can be a single-core processor, multi-core processor, computing cluster, or any number of other configurations. The processors 2101, also referred to as processing circuits, are coupled via a system bus 2102 to a system memory 2103 and various other components. The system memory 2103 can include a read only memory (ROM) 2104 and a random access memory (RAM) 2105. The ROM 2104 is coupled to the system bus 2102 and may include a basic input/output system (BIOS), which controls certain basic functions of the computer system 2100. The RAM is read-write memory coupled to the system bus 2102 for use by the processors 2101. The system memory 2103 provides temporary memory space for operations of said instructions during operation. The system memory 2103 can include random access memory (RAM), read only memory, flash memory, or any other suitable memory systems.

The computer system 2100 comprises a graphics processing unit (GPU) 2130 that can include one or more processing cores and memory devices. The GPU can be used as a co-processor by the processors 2101 to perform one or more operations described herein.

The computer system 2100 comprises an input/output (I/O) adapter 2106 and a communications adapter 2107 coupled to the system bus 2102. The I/O adapter 2106 may be a small computer system interface (SCSI) adapter that communicates with a hard disk 2108 and/or any other similar component. The I/O adapter 2106 and the hard disk 2108 are collectively referred to herein as a mass storage 2110.

Software 2111 for execution on the computer system 2100 may be stored in the mass storage 2110. The mass storage 2110 is an example of a tangible storage medium readable by the processors 2101, where the software 2111 is stored as instructions for execution by the processors 2101 to cause the computer system 2100 to operate, such as is described herein below with respect to the various Figures. Examples of computer program product and the execution of such instruction is discussed herein in more detail. The communications adapter 2107 interconnects the system bus 2102 with a network 2112, which may be an outside network, enabling the computer system 2100 to communicate with other such systems. In one embodiment, a portion of the system memory 2103 and the mass storage 2110 collectively store an operating system, which may be any appropriate operating system to coordinate the functions of the various components shown in FIG. 18.

Additional input/output devices are shown as connected to the system bus 2102 via a display adapter 2115 and an interface adapter 2116 and. In one embodiment, the adapters 2106, 2107, 2115, and 2116 may be connected to one or more I/O buses that are connected to the system bus 2102 via an intermediate bus bridge (not shown). A display 2119 (e.g., a screen or a display monitor) is connected to the system bus 2102 by a display adapter 2115, which may include a graphics controller to improve the performance of graphics intensive applications and a video controller. A keyboard 2121, a mouse 2122, a speaker 2123, etc. can be interconnected to the system bus 2102 via the interface adapter 2116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 18, the computer system 2100 includes processing capability in the form of the processors 2101, and, storage capability including the system memory 2103 and the mass storage 2110, input means such as the keyboard 2121 and the mouse 2122, and output capability including the speaker 2123 and the display 2119.

In some aspects, the communications adapter 2107 can transmit data using any suitable interface or protocol, such as the internet small computer system interface, among others. The network 2112 may be a cellular network, a radio network, a wide area network (WAN), a local area network (LAN), or the Internet, among others. An external computing device may connect to the computer system 2100 through the network 2112. In some examples, an external computing device may be an external webserver or a cloud computing node.

It is to be understood that the block diagram of FIG. 18 is not intended to indicate that the computer system 2100 is to include all of the components shown in FIG. 18. Rather, the computer system 2100 can include any appropriate fewer or additional components not illustrated in FIG. 18 (e.g., additional memory components, embedded controllers, modules, additional network interfaces, etc.). Further, the aspects described herein with respect to computer system 2100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various aspects.

It should be noted that aspects of the technical solutions described herein address technical challenges with a measurement tool such as a laser tracker, a scanner, etc., for which a periodic on-site compensation is desired. Some examples of such a measurement tool 120 are provided herein, however, aspects of the technical solutions herein can be applied to other measurement tools. As noted, the on-site compensation is performed to adjust mechanical misalignments that can occur in the measurement tool 120 over time. The mechanical misalignment can include angular parameters, which can lead to horizontal error, vertical error, etc., which in turn lead to data having less than a desired accuracy being captured. On-site compensation is also adjust the measurement tool to compensate for electronics/optics aging effects, such as changed APD response times or capacitors change. Such effects can also lead to an accuracy reduction. The angular parameters of a measurement tool 120 can include:

TriggerOffset: rotation angle of an optical encoder index position relative to the down-direction of the measurement tool 120;

MirrorDeviation: Deviation of a rotating mirror surface from ideal, e.g., 45';

MirrorAxis: Deviation of angle between pan rotation axis and mirror rotation axis from ideal, e.g., 90°;

Hor- and VertLaser: Horizontal/vertical deviation of laser propagation direction from ideal propagation direction before hitting a rotating mirror;

LaserOffset: Offset of laser (meters) at protective glass in front of rotation mirror from ideal position;

HousingOffset: Offset between pan rotation axis and ideal horizontal center of the measurement tool 120.

Additional, or different angular parameters can affect a measurement tool 120 in other aspects, and the above list provides some examples of the angular parameters. The angular parameters can change during the lifetime of the measurement tool 120, for example due to mechanical or temperature shock loading. If the parameters change, the cartesian coordinates, measurements, or other digital representations provided by the measurement tool 120 can have an accuracy outside of a desired specification.

The onsite compensation identifies same directions between the front and back surface of the measurement tool 120. From this pair of corresponding directions one or more of the angular parameters can be calculated. A corresponding direction is identified by having a pair of matching features between the front and back face of the measurement tool 120.

To this end, the compensation includes at least two steps. In a first step, a scan recording is performed. The scan recording includes recording a scan using the measurement tool 120 such that the scan includes redundant data between front and back face of the measurement tool 120. Only then is it possible to detect corresponding directions between front and back face. The measurement tool 120 would then rotate, for example, 360 degrees instead of only 180 degrees.

In a second step, the recorded scan from the first step is analyzed. In the analysis natural (existing) features are detected and their corresponding same features are identified. From these correspondences a nonlinear optimization calculation is used to optimize the angular parameters to minimize the angular error between corresponding rays.

If on-site compensation process for the measurement tool 120 is not performed, or if the compensation process does not calculate the correct parameters, the measurement data that is recorded by the measurement tool 120 will be inaccurate. Therefore, robustness of the on-site compensation is a crucial requirement.

Accordingly, accuracy of the compensation process without the initial setup presents technical challenges for the measurement tool 120. In some cases, for example, the site where the measurement tool is to be used does not have the requisite area where the compensation can be performed. Without compensation, the digital representations/measurements captured by the measurement tool 120 can be inaccurate. Recapturing the digital representation/measurements is impractical, if not impossible, in several cases. For example, the site (factory floor, crime scene, accident scene, office building, construction site, etc.) that is to be captured can change substantially, prohibiting such recapture. In addition, or alternatively, the recapturing can be prohibited by resource (time, efforts, travel, etc.) costs.

Aspects of the technical solutions described herein address such technical challenges. Aspects of the technical solutions herein facilitate performing compensation that does not need special test set up and that can be seamlessly integrated into the data-capture workflow for the measurement tool 120. The measurement tool 120 can be compensated using existing natural features in the scene instead of using artificial targets 5 (e.g., printed markers).

Figure 19:
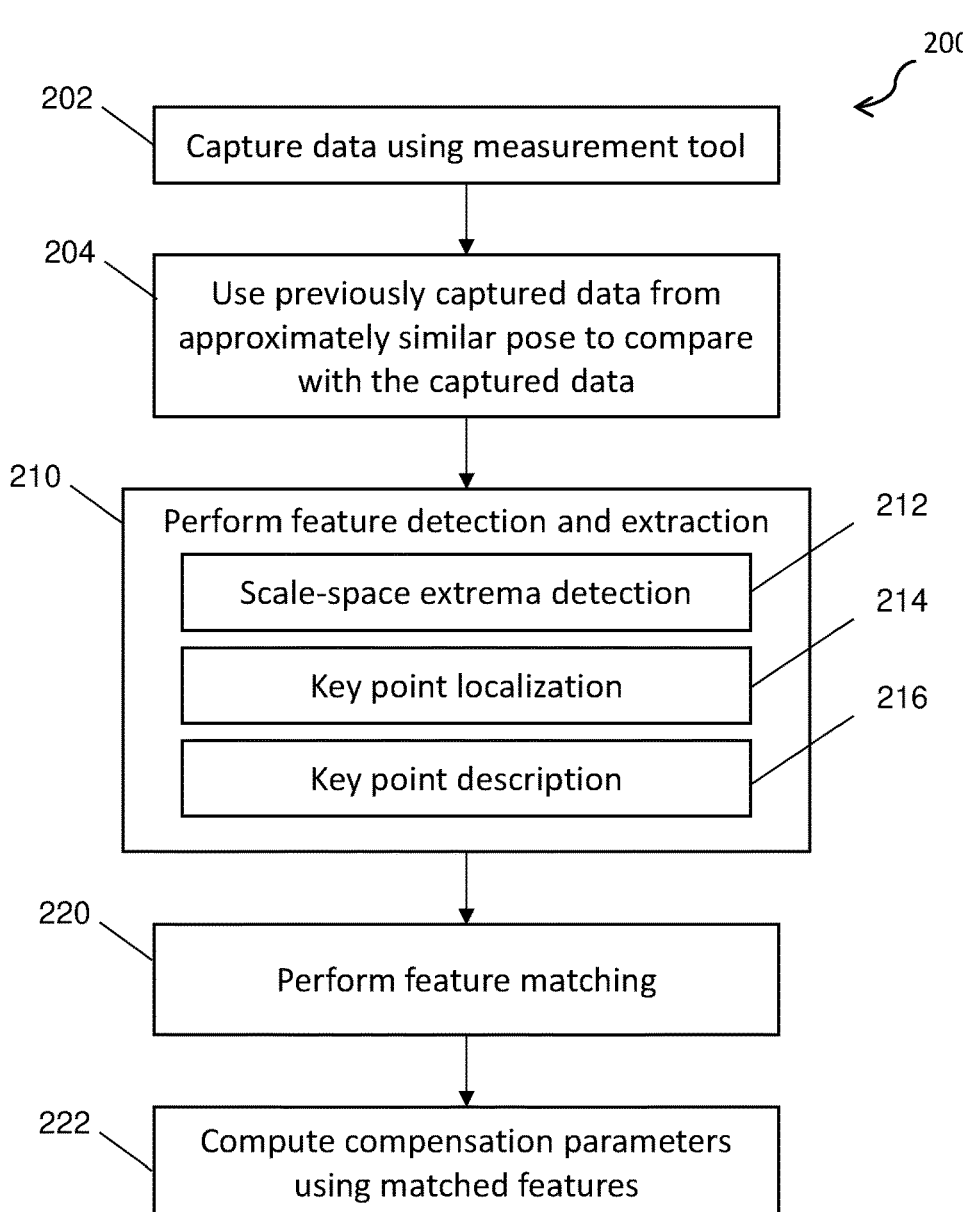
FIG. 19 depicts a flowchart of performing an on-site
compensation using natural features according to one or
more aspects.

FIG. 19 depicts a flowchart to perform a robust on-site compensation for a measurement tool according to one or more aspects of the technical solutions described herein. The method 200 for the on-site compensation can be performed without setting up the surrounding, as is required by the present solutions (e.g. the placing of predetermined targets of FIG. 1). The method 200 is initiated in response to an operator requesting the compensation. The method 200 includes capturing data by the measurement tool 120, at block 202. The captured data 125 can include a 3D point cloud and a 2D image. In some aspects, only a 3D point cloud can be captured, which provides a distance of each feature to the measurement tool 120. A scan has to be recorded with redundant data between front and back face of the measurement tool 120. Only then is it possible to detect corresponding directions between front and back face. The measurement tool 120 rotates, for example 360 degrees (instead of only 180 degrees) to capture such data that is to be used for the compensation. The measurement tool 120 captures a first data (e.g., front-facing data) and a second data (e.g., back facing data), which are used for the compensation.

At block 204, the measurement tool 120 captures the first data and the second to perform the compensation. In one or more aspects, natural features are detected and their corresponding features in the redundant data are identified. From these correspondences a nonlinear optimization determines the angular parameters to reduce or minimize the angular error between corresponding rays. The corresponding features do not share the same ray. Because of the offsets (e.g., LaserOffset and HousingOffset) the redundant feature measurements start at different positions and not at exactly the mathematical origin of the measurement tool 120 (0). Accordingly, the "corresponding rays" to be optimized are theoretical rays, starting at 0, constructed from the measurement rays using the angular parameters.

At block 210, feature extraction is performed on both, the first and the second data. The features that are extracted are detected based on landmarks or image features in the captured data 125. In some aspects, the features are key points in the captured data 125, such as corners, which are unique in the captured data 125. The extracted features include natural features, that already exist in the surrounding. In some aspects, the extracted features can also include artificial landmarks (e.g., target spheres or checkerboard targets), placed by the operator in the surrounding.

For example, image feature extraction algorithms like Harris corner detector, Harris-Laplace-scale-invariant version of Harris detector, SIFT/SURF, FAST, BRISK, ORB, KAZE, AKAZE, or any other such algorithms that can extract scale-invariant features. Some of the feature extractors include descriptor definitions, such as in the case of SIFT, SURF, BRISK and ORB. In practice any feature descriptor definition can be associated to the extracted features using descriptor definitions such as, normalized gradient, PCA transformed image patch, histogram of oriented gradients, GLOH, LESH, BRISK, ORB, FREAK and LDB.

The feature extraction includes, at block 212, scale-space extrema detection. The scale-space extrema detection identifies locations and scales that can be repeatedly assigned under different views of the same scene or object. For scale-space extrema detection, image pyramids are constructed.

Figure 20:
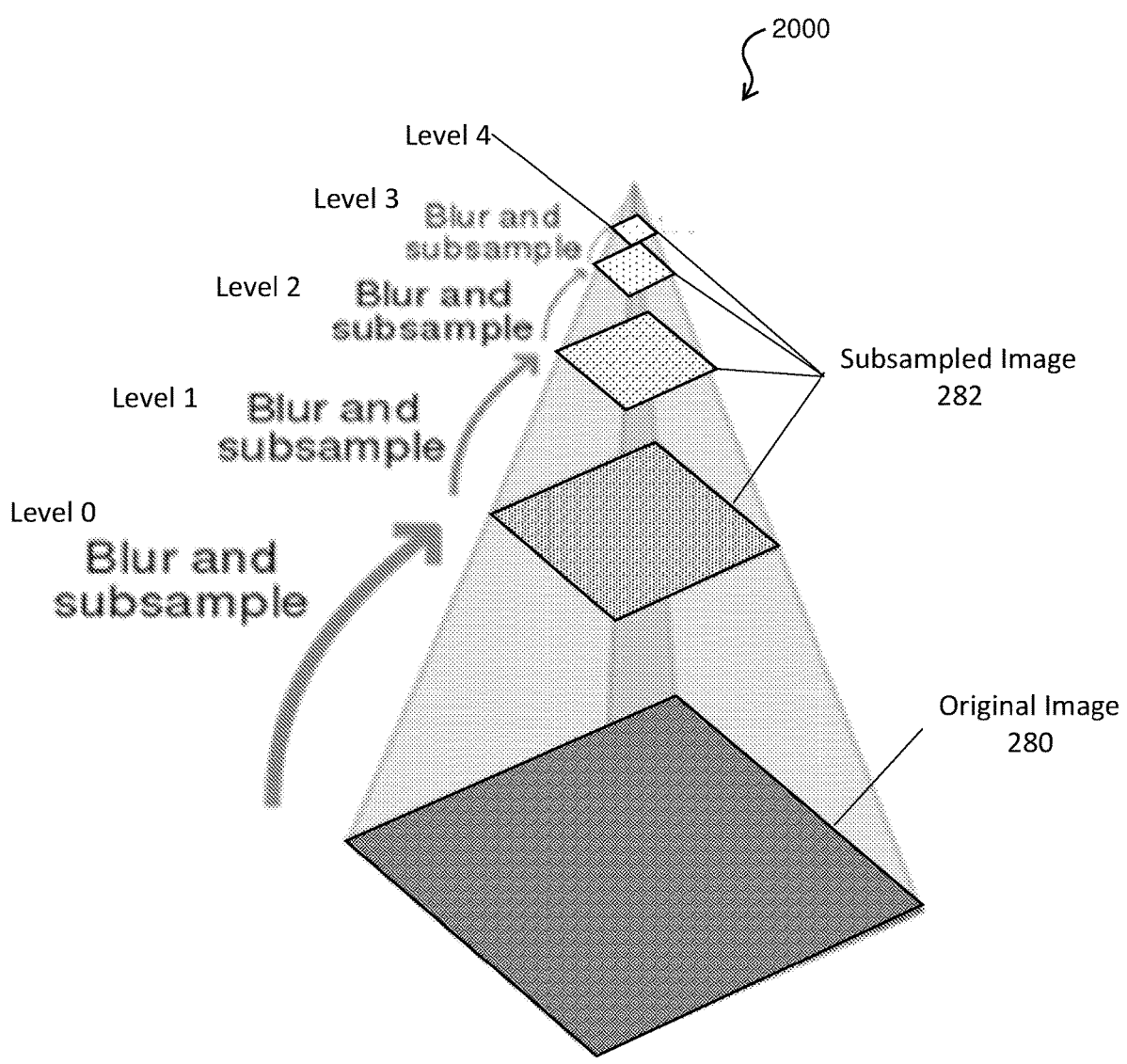
FIG. 20 depicts an image pyramid used for feature extrac-
tion according to one or more aspects.

FIG. 20 depicts construction of an image pyramid with five octaves according to one or more aspects. Each octave in the image pyramid 2000 includes an image. At the base (first octave, level 0) of the image pyramid 2000 is the original image 280 from the captured data 125. A subsampled image 282 is generated at each subsequent octave (level 1, 2, etc.). The subsampled image 282 at level X is generated from the image in the previous level, i.e., level X−1. Accordingly, the second octave has the subsampled image 282 that is generated by subsampling the original image 280 from the first octave; the third layer includes subsampled image 282 that is generated by subsampling the image from the second octave, and so on. In some aspects, the subsampling can include smoothing of the image. In this manner, at each subsequent level, the size (resolution, i.e., number of pixels) of the image reduces. In other aspects, image pyramid 2000 can include a different number of octaves. Here, subsampling an image includes reducing the resolution of the image and selecting a sample of the pixels from the original image 280. The subsampling can be performed using a specific scale space, such as Gaussian scale space (Gaussian pyramid), Laplacian of gaussian (LOG) scale space, Difference of gaussian (DOG) scale space, etc. The image pyramid 2000 represents a "scale space" and is a collection of images having different scales, generated from a single image (original image 280).

Figure 21:
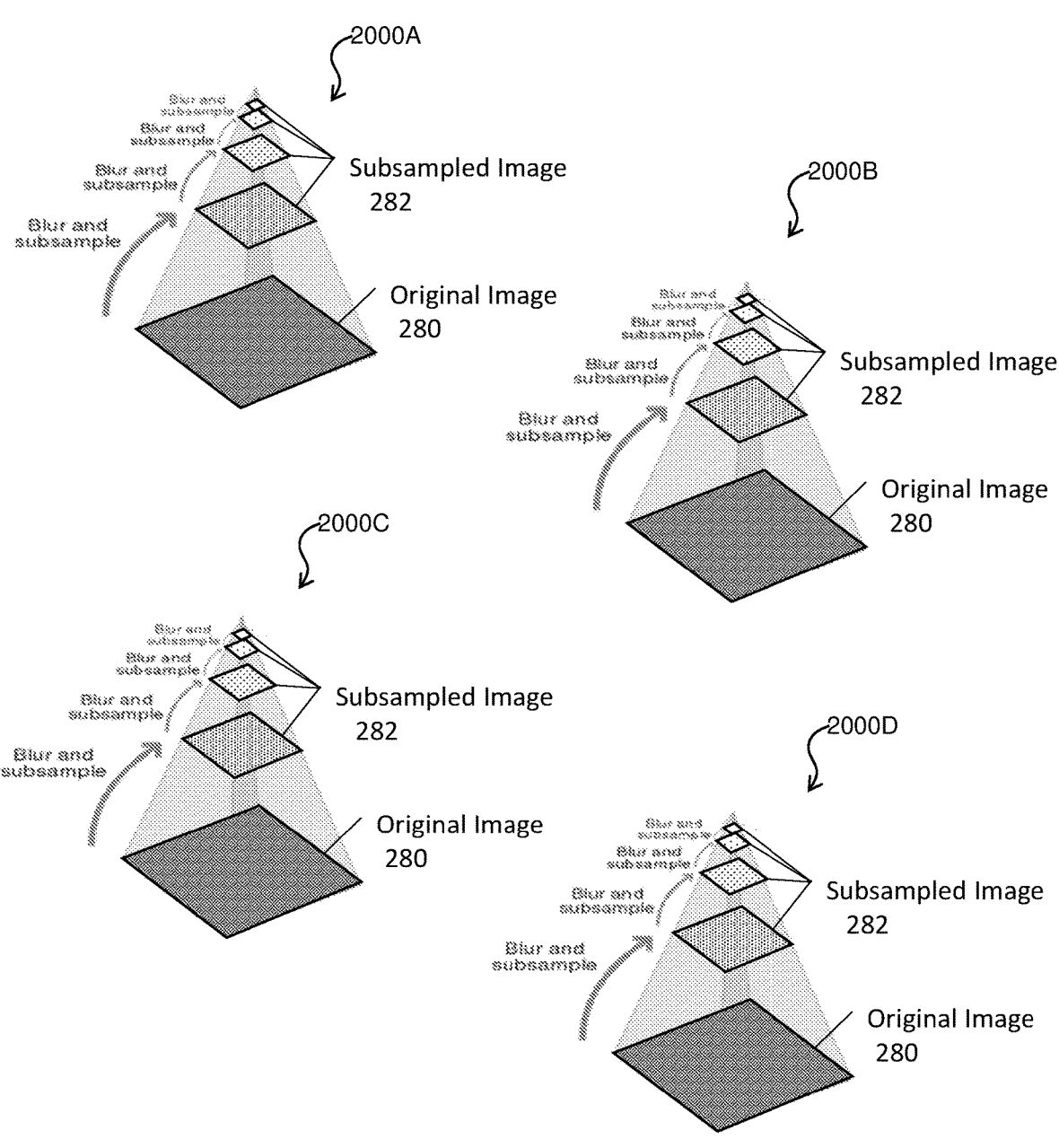
FIG. 21 depicts multiple image pyramids used for feature
extraction according to one or more aspects.

In some aspects multiple image pyramids 2000 are generated at different blur levels. FIG. 21 shows an example of four image pyramids 2000A, B, C, D, in which each image pyramid has five octaves, and in which the starting image 280 (level 0) is a copy of the original image from the captured data with varying degrees of blurring applied. For example, in the image pyramid 2000A, the original image is used as is; in the image pyramid 2000B, the original image is blurred using a Gaussian blur and used as the starting image 280; in the image pyramid 2000C, the original image is blurred using a second Gaussian blur and used as the starting image 280, and so on. It is understood that in other aspects, a different number of blur levels (i.e., different number of image pyramids 2000) and/or different number of octaves can be used. Further, the blurring can be performed using different techniques than Gaussian blurring.

Figure 22:
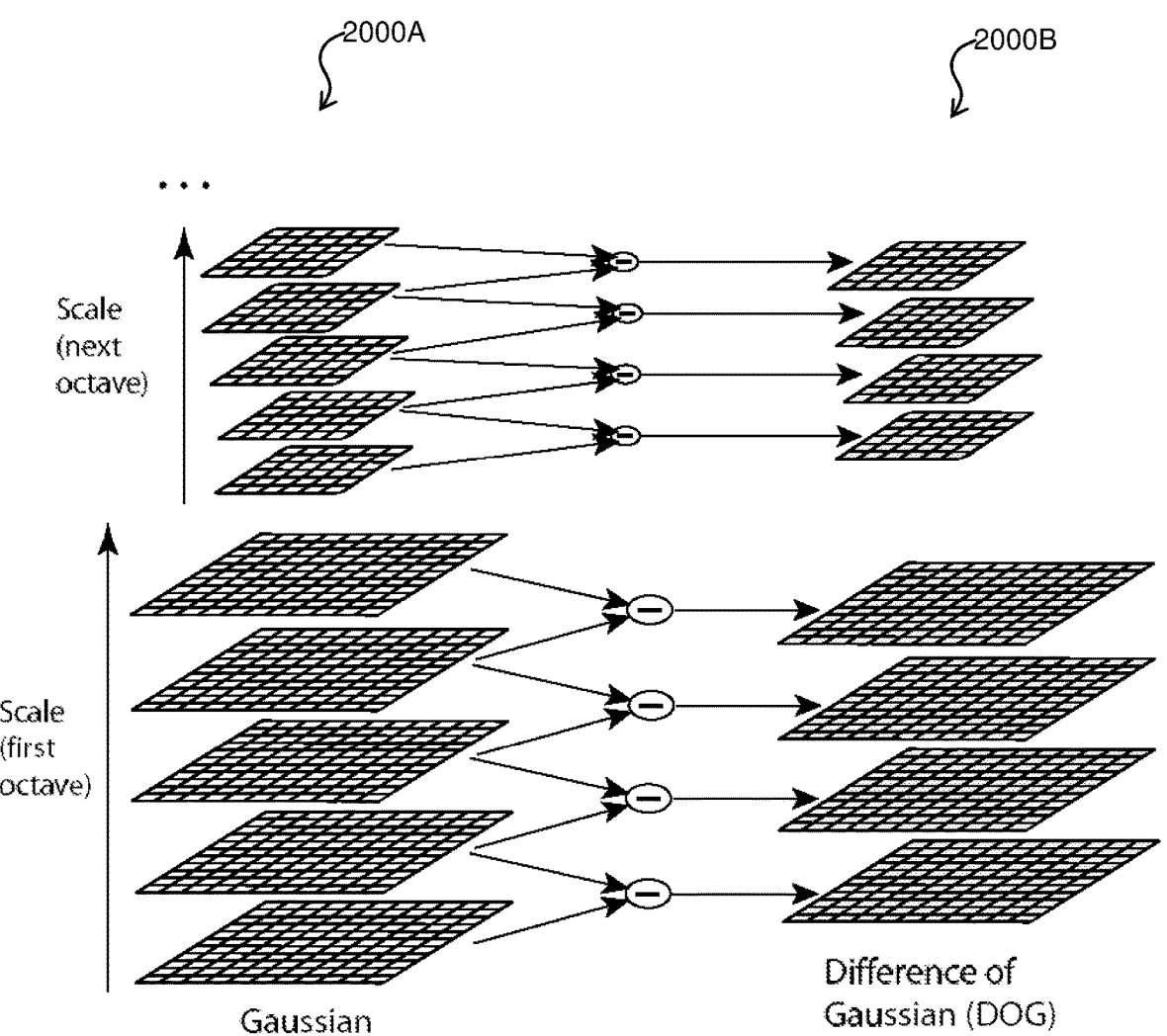
FIG. 22 depicts a scale-invariant feature extraction
according to one or more aspects.

The different image pyramids 2000A-D so far created provide images of multiple scales (often represented by 6) and with different blur for each of them to reduce the noise in the image. In some aspects, Difference of Gaussian (DoG) is used to enhance the features based on subtraction of one blurred version of an image from another. DoG creates another set of images, for each octave, by subtracting every image from the previous image in the same scale. FIG. 22 provides a visual depiction of the DoG computation. Here, each octave is represented in a vertical form. On the left, are images from the first octave (thus having the same scale). Each subsequent image is created by applying the Gaussian blur over the previous image. On the right (DoG), images generated by subtracting the consecutive Gaussians are obtained. It is understood that the DoG computation is performed for all the octaves.

The calculation of the several scale spaces and subsampling in each different scale space to generate the image pyramids 2000 is computationally resource intensive. Hence, a technical challenge with this step is that such computations can take a long time, and hence, can be prohibitive to performing the on-site compensation. Technical solutions described herein improve the scale-space extrema detection by speeding up the calculation. The images which are collected for an on-site compensation are taken from approximately identical nodal points, i.e., location and pose of the measurement tool 120 in the surrounding. Therefore, the images 280 in the captured data (first and second captured data) can be assumed to have the same scale. In addition, the captured first data and the second data are obtained from the same sensors (in the measurement tool 120) with similar noise level. Accordingly, the complexity of feature extractors can be reduced.

Speeding up the feature extraction by reducing the complexity of the feature extractors can be applied to any of the scale-invariant feature extraction algorithms mentioned herein or otherwise used. Instead of creating several image pyramids 2000A-D, technical solutions herein create a single image pyramid 2000. In addition instead of creating a multi-octave pyramid, only one octave (or one image) is processed. For example, only level 0 can be reconstructed. However, for additional speed up, a lower resolution image, like the further subsampled images at level 1 or level 2 can be used in some aspects. In the case that after processing the selected level, the number of key points or features that are extracted is not sufficient, i.e., below a predetermined threshold, a higher resolution images of the pyramid 2000 is used. The selection of the level to be used can be repeated until the threshold number of key points are extracted.

Referring to FIG. 19, the feature extraction further includes, at block 214, key point localization to fit a model to determine the location and scale of the extracted features. Key points are features that are selected from the extracted features based on a measure of stability. In some aspects, a pixel from the image 280 with the "best scale" is selected by computing local maxima and minima for the generated images. To locate the local maxima and minima of an image, every pixel in that image is compared with its neighboring pixels, which include surrounding pixels of that image (in which the pixel lies), but also pixels from the previous and next image in the octave. In other words, a pixel is selected as a potential scale-invariant key point based on comparing that pixel with its adjacent (e.g., 8-neighbor) pixels and with neighboring pixels (e.g., 9-neighbor) at the upper and lower scales. In an example case, where 8 adjacent pixels from that image, and 9 neighboring pixels from upper and lower scales are used, each pixel is compared with 26 other pixel values to find whether it is the local maxima/minima.

However, because the number of images per pyramid is reduced, the aspects of the technical solutions herein provide an improvement (speed-up) by reducing the number of pixel comparisons required. Because there is only one image, the comparison is done based on, e.g., 8-neighbor pixels resulting in a gain in speed by avoiding additional comparisons.

In addition to the intensity value for an image pixel, in case of some measurement tools, such as a scanner, the distance value for each pixel is also available. The distance information is used, in some aspects, to filter out noisy data, for example grass/trees. The noisy areas can give sharp features in some case, however, such features are not stable with time. With the distance information, the underlying surface can be analyzed. A surface with many jumps and edges is probably not a reliable and suited for interpolation. Both properties are required for subpixel analysis of the images.

Figure 23:
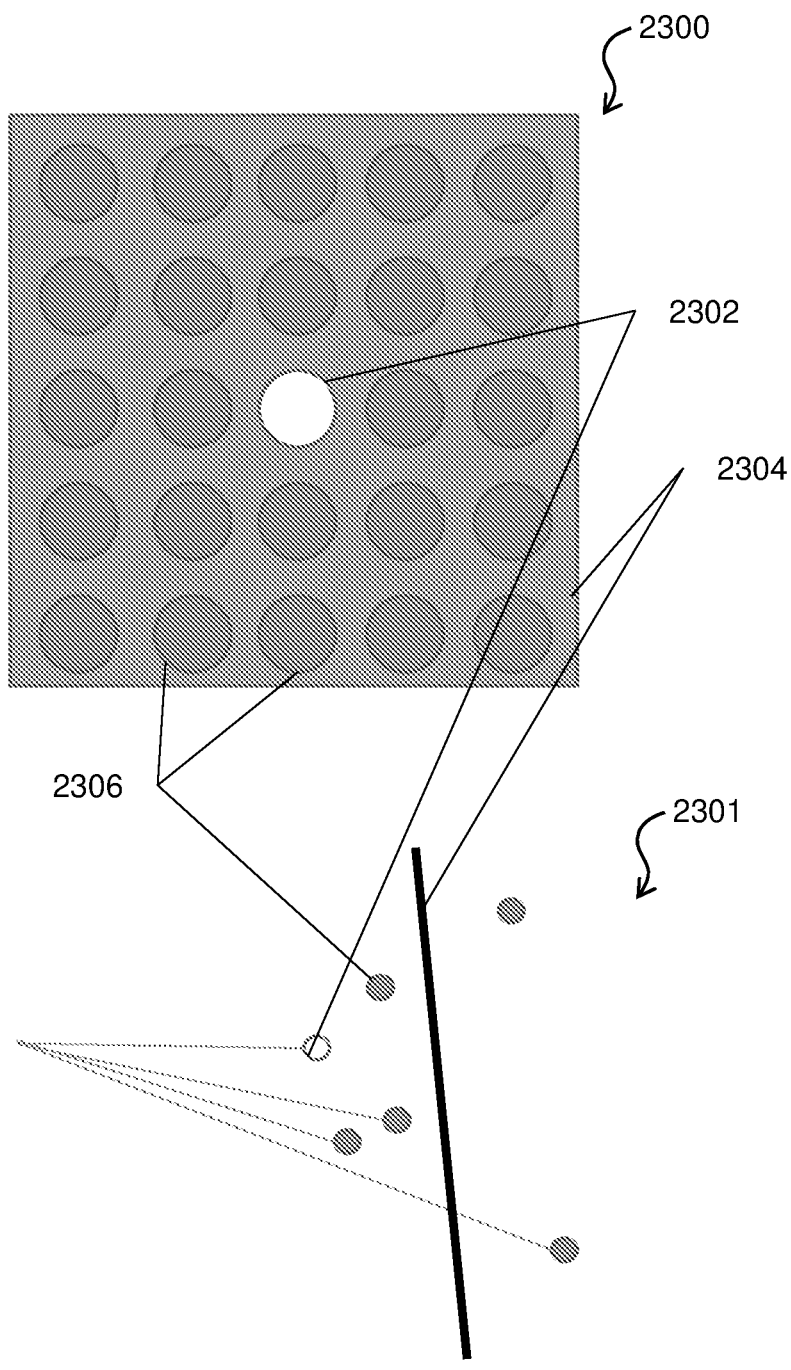
FIG. 23 depicts feature filtering based on depth informa-
tion according to one or more aspects.

FIG. 23 depicts an example scenario of filtering key points based on depth values according to one or more aspects. A set of points captured is shown from a front view 2300, and a side view 2301. As can be seen in the side view 2301, the points that are captured are not on a single plane.

Consider that the pixel 2302 is selected as a key point (at block 212). A plane 2304 (or other geometrical surface) is fitted to the neighboring 3D points 2306. The neighboring 3D points 2306 are points that are within a predetermined distance from the key point pixel 2302. If the average error of the fitting is larger than a threshold, the pixel 2302 is filtered (i.e., is not accepted/used as a key point).

Because the technical solutions herein are addressing the technical challenge of using natural features as basis for the on-site compensation, the environment that is scanned cannot be influenced. Therefore, the presence of features are also not influenced by aspects of technical solutions herein. Technical solutions herein facilitate a feature distribution as a 3 dimensional property: horizontal angle, vertical angle and distance to the measurement tool 120.

Mathematically several of the angular parameters correlate with each other in certain angular ranges of the mirror rotation. For example, at the poles, trigger offset and horizontal laser both lead to angular errors in the same direction.

In order to break these correlations certain feature distributions along the mirror rotation angles are required. The feature distribution can be used for selecting only a subset of all parameters for optimization. For example, in order to allow optimization of the laser offset and housing offset features at close distances (−1 to 3 meters) are required. In some aspects, during feature detection (block 212) the measurement tool can cause a predetermined feature distribution by accepting, for example, weaker features in areas where correlations between the parameters have to be determined and changed.

In order to use only reliable features instead of a 360 degrees rotation scan, in some aspects, a 720 degrees rotation scan is recorded (at block 202). In some aspects, only the features that are identified in both rotations in the same face of the scanner at exactly the same position for the on-site compensation algorithm are selected. In this manner, the on-site compensation can be implemented even in dynamic environments, like offices, factories, etc., at the cost of longer data acquisition time (compared to 360 degree scan).

In some aspects, the measurement tool 120, is not warmed up completely before the on-site compensation is started. If the measurement tool 120 is not warmed up the angular parameters are inaccurate. Therefore, angular parameter changes can occur even within the time scale of one on-site compensation scan (3-4 minutes) that the on-site compensation algorithm can detect. Based on a natural feature that was captured in the first data at a first time point and in the second data at a second timepoint, it can be determined whether the measurement tool is not sufficiently configured for compensation, by comparing with other natural features matched in the two data.

In one or more aspects, based on repetitive measurement of the features in the first data and the second data, features are assigned a quality/repeatability scores. In some aspects, the compensation parameter optimization uses only those features that have a high quality/repeatability score to improve the quality of the compensation parameters. Here, "high" quality/repeatability score indicates that the score is at least a predetermined threshold value. In some aspects, the angular parameters are given a temporal dependence, for example a warming-up effect. Accordingly, when a first feature, for example, feature-A from the front face is recorded at the beginning of the scan, and a corresponding feature-B from the back face, recorded at the end of the scan, the temporal change of the angular parameters can be determined within one scan. Note that for this process feature A and feature B may also be measured in the same face of the measurement tool 120 (as long as they are measured at different times).

In one or more aspects, in response to determining that the measurement tool 120 is insufficiently configured (e.g., not warmed up), the compensation parameters (i.e., angular parameters) are temporarily stored, until the measurement tool 120 is configured for compensation. For example, the compensation parameters are stored on a storage disk in the measurement tool without being applied to the sensors of the measurement tool 120. In some aspects, after computing the compensation parameters, and determining that the measurement tool 120 is insufficiently configured (e.g., warmed up), the measurement tool 120 is periodically checked to determine the configuration sufficiency, for example, every seconds, every 1 minute, etc. Upon determining that the measurement tool 120 is sufficiently configured, the compensation parameters that are temporality stored, are applied to the measurement tool 120 to complete the on-site compensation. The temporarily stored compensation parameters are deleted, in some examples.

In some aspects, the sufficiency in configuration can be determined based on a temperature sensor embedded in the measurement tool 120, which indicates the temperature (e.g., whether warmed up) of the measurement tool 120. For example, the measurement tool 120 may be deemed to be warmed up if the temperature sensor indicates at least a predetermined temperature value of the measurement tool 120. Other sensors can be embedded in the measurement tool 120 to determine configuration sufficiency, in other aspects.

In some aspects, instead of waiting for the measurement tool 120 to achieve a predetermined configuration sufficiency, the compensation parameters are recomputed for the state of the measurement tool 120. This addresses a technical challenge in scenarios where the measurement tool 120 may not practically achieve the desired configuration sufficiency. The configuration insufficiency may remain, for example, due to one or more external factors. For example, if the measurement tool 120 is being used in a cold environment, a desired (predetermined) temperature at which the measurement tool 120 is deemed to be warmed up, may not be achievable. Accordingly, at block 222, another set of compensation parameters is computed (i.e., compensation parameters are re-computed) for the measurement tool 120 using the set of compensation parameters that were recently computed. The re-computed compensation parameters are for the insufficient configuration using a different model of the measurement tool 120 to infer the compensation parameters in the insufficient configuration. In some aspects, several models of the measurement tool 120 at different operating conditions (e.g., different temperatures, different humidity levels, different altitudes, different brightness levels, etc.) are stored. The closest model is selected based on the present operating conditions in which the measurement tool 120 is being used. The selection of the model can be automatic based on the one or more sensors 122 of the measurement tool 120. Alternatively, or in addition, the operator of the measurement tool 120 can select (edit the automatically selected) model being used to compute the on-site compensation parameters.

Using a larger scan, for example, 720 degrees rotation can further improve the analysis. Such an analysis can identify that the measurement tool 120 has not completely warmed up and prohibit the angular parameters that are determined with an "un-warmed" scanner from being set to the measurement tool 120.

Typically, in the existing solutions, feature extraction includes orientation assignment to determine orientation for each key point region. However, in the aspects of the present technical solutions, because corresponding features have approximately identical orientation, computation of the feature orientation is bypassed. Accordingly, further speed-up is gained by bypassing the computation of the orientation.

At block 216, key point descriptors are generated. The descriptors are generated using known techniques. However, it should be noted that depending on the method of feature matching (will be discussed in the following sections), the computation of descriptors can be bypassed to provide additional speed-up by reducing the computations.

At block 220, feature matching is performed to determine matching features between the first data and the second data captured by the measurement tool 120.

In some aspects, feature matching is performed using template matching techniques. Template matching is a technique in digital image processing for finding parts of an image which match a template image. In existing implementations of template matching, first a part of the search image is selected for use as a template. Here, a search image is referred to as $S(x, y)$, where $(x, y)$ represent the coordinates of each pixel in the search image, a template is referred to as $T(x_t, y_t)$, where $(x_t, y_t)$ represent the coordinates of each pixel in the template. In existing template matching the center (or the origin) of the template $T(x_t, y_t)$ is moved over each $(x, y)$ point in S to calculate a cost value between the coefficients in $S(x, y)$ and $T(x_t, y_t)$ over the whole area spanned by the template. The cost value can be a sum of products, although other statistical techniques can also be used in other aspects. As all possible positions of the template with respect to the search image are considered, the position with lowest cost is deemed to be the optimal position.

In some instances, the image captured by the measurement tool 120 can be a laser intensity. In other instances, the image is a color image, such as an RGB, or RGB-D image. Other color models (e.g., CMY) can be used in other aspects.

Existing template matching can be computationally expensive because the template T has to be moved across each pixel in S to determine the optimal position, i.e., best match. The search space S is initially the image captured by the measurement tool 120. In some aspects, for a typical 100 Mega-Pixel image, the template T has to move over 100'000'000 pixels and the cost value is computed for this number of pixels, which is computationally very time-consuming.

In aspects of the technical solutions herein, an improvement in performance can be achieved by reducing the search space because the approximate position of the matched feature can be estimated by an approximate alignment of the two images, which are taken for correcting the angles of measurement tool (e.g., two laser intensity images captured to correct a laser scanner). In addition, as the two images are aligned and they are taken from almost the same nodal point, there is no scale difference nor perspective or other distortions existing between the template image and the search image. Therefore, no geometrical transformation is needed to be performed on search space. Accordingly, any additional operation during this process, which is time consuming and limits the speed of computation, can be bypassed.

It should be noted that for template matching we don't need to extract features on both images (i.e., first data and second data). Feature extraction can be done on only one image (either first data or second data). In addition, computation of feature orientation and descriptor can be bypassed as well.

In some aspects, the feature matching is performed using a K-nearest Neighbor (KNN) similarity search algorithm. The process of feature matching using KNN is also time consuming and computationally intensive. The computation can be sped-up by using approximated nearest neighbor search like FLANN algorithm or the execution of the process by algorithms that can be run on graphics processing units, or specialized hardware, like Faiss.

At block 222, using the matching features, angular parameters for the compensation are determined.

The on-site compensation process is a critical functionality for the measurement tool 120, such as laser scanners. If the measurement tool 120 does not calculate the correct parameters, all the subsequent captured data 125 that is recorded after the on-site compensation has completed can be inaccurate. Therefore robustness of the algorithm used for the on-site compensation is crucial.

For example, consider a scanner that is mounted on a tripod that is unstable, i.e. the tripod moves during scanning or someone touches the tripod/scanner during scanning, which causes a change in pose of the scanner. In this case, the identified corresponding directions between front and back surface may be wrong, leading in the optimization to bad parameters. In some aspects, the ray directions have to be correct on the order of 1.5E-4 radian for the scanner to produce accurate results. Therefore, especially rotational changes in the pose are susceptible to causing less than a desired level of accuracy as rotational changes directly translate into angular errors of the scanner. It is understood that although a scanner is used to describe the example scenario, other measurement tools 120 can also be affected in the same manner.

Such a pose change can be identified by scanning the same area twice in the same scan half. So the scanner may rotate not only 360 degrees but even 400 degrees. Then the scanner scans two areas (one in the front face, one in the back face), covering in the example 40 degrees, twice.

Using the scans of the two areas (i.e., first data, second data) the method described herein (e.g., method 200) can be used to calculate a new set of angular parameters for the measurement tool 120. The method can be used to identify features, for example in front-face 0 to 40 degrees (A) and front face 360 to 400 degrees (B). The corresponding features between A and B are determined, and their median angular error (split in vertical and horizontal direction, to have signed errors) is calculated. The median error should ideally be close to 0. If the median error is higher than a predetermined threshold, it is deemed that the measurement tool 120 has moved during scanning, and hence, the captured data cannot be used for calculating the angular parameters. Accordingly, new data capture, and calculation of angular parameters is initiated to prevent the measurement tool 120 to be configured with inaccurate angular parameters. Note that in contrast to the angular parameters listed above, the influence of a pose change should be independent of the mirror rotation axis within one face of the scanner, allowing such a robust median analysis. A pose change in the translation in a first approximation can be neglected.

Additionally, before applying the compensation parameters to the measurement tool 120, in one or more aspects, it can be determined whether the measurement tool is sufficiently configured for the on-site compensation. For example, the measurement tool 120 may not be sufficiently warmed up as noted herein. In one or more aspects, the on-site compensation can include determining, based on a first timepoint at which a natural feature was captured in the first data and a second timepoint at which the (same/matching) natural feature was captured in the second data, that the measurement tool 120 is not sufficiently configured (e.g., warmed up) for compensation. In one or more aspects, in response to the measurement tool 120 being insufficiently configured for compensation, the compensation parameter are not applied to the one or more sensors of the measurement tool 120 (i.e., bypassed). Alternatively, in response to the measurement tool 120 being determined to be sufficiently configured for compensation, the compensation parameters are applied to the one or more sensors, thus performing an on-site compensation.

It will be appreciated that aspects of the present disclosure may be embodied as a system, method, or computer program product and may take the form of a hardware embodiment, a software embodiment (including firmware, resident software, micro-code, etc.), or a combination thereof. Furthermore, aspects of the present disclosure may take the form of a computer program product embodied in one or more computer-readable medium(s) having computer-readable program code embodied thereon.

One or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer-readable storage medium may be a tangible medium containing or storing a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

The computer-readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present disclosure are described herein with reference to flowchart illustrations and/or block diagrams of methods, apparatus (systems) and computer program products according to aspects. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

While the invention has been described in detail in connection with only a limited number of aspects, it should be readily understood that the invention is not limited to such disclosed aspects. Rather, the invention can be modified to incorporate any number of variations, alterations, substitutions or equivalent arrangements not heretofore described, but which are commensurate with the spirit and scope of the invention. Additionally, while various aspects of the invention have been described, it is to be understood that aspects of the invention may include only some of the described aspects. Accordingly, the invention is not to be seen as limited by the foregoing description but is only limited by the scope of the appended claims.

What is claimed is:

1. A system comprising for capturing a digital representation of an environment, the system having at least one processor configured to compensate a measurement tool used to measure distances within the environment by performing a method comprising:

capturing, at a first timepoint, first data from laser light reflected by objects in the environment using the measurement tool;

capturing, at a second timepoint, second data from laser light reflected by objects in the environment using the measurement tool;

detecting a landmark of the environment captured in the first data and the second data;

computing a difference between a position of the landmark in the first data and a position of the landmark in the second data;

computing a compensation parameter for adjusting subsequent distance measurements made by the measurement tool based on the difference; and adjusting the measurement tool using the compensation parameter.

2. The system of claim 1, wherein the first data is captured by a front face of the measurement tool and the second data is captured by a back face of the measurement tool.

3. The system of claim 1, wherein the first data and the second data comprise images, and the first data and the second data comprise depth data.

4. The system of claim 1, wherein the landmark is detected using feature extraction.

5. The system of claim 1, wherein the landmark detected in the first data is matched to the landmark captured in the second data using template matching.

6. The system of claim 1, wherein the landmark from the first data is matched with the landmark in the second data by using a nearest neighbor search.

7. The system of claim 1, wherein the landmark is a plurality of objects in the environment, and the method further comprises: determining, based on a first timepoint at which the landmark was captured in the first data and a second timepoint at which the landmark was captured in the second data, whether the measurement tool is sufficiently configured for compensation.

8. The system of claim 7, wherein, in response to the measurement tool being sufficiently configured for compensation, the compensation parameter is applied to the measurement tool.

9. The system of claim 7, wherein, in response to the measurement tool being insufficiently configured for compensation, bypassing applying the compensation parameter to the measurement tool.

10. The system of claim 9, wherein the method further comprises:

storing the compensation parameter temporarily;

periodically checking the sufficiency of configuration of the measurement tool for compensation; and in response to the measurement tool being sufficiently configured for compensation, applying the temporarily stored compensation parameter to the measurement tool.

11. The system of claim 9, wherein the compensation parameter is a first compensation parameter, and the method further comprises:

storing the first compensation parameter temporarily;

computing a second compensation parameter based on the first compensation parameter and a model of the measurement tool associated with the insufficient configuration; and applying the second compensation parameter to the measurement tool.

12. The system of claim 1, wherein, the method further comprises, based on repetitive measurement of the landmark in the first data and the second data, assigning a quality/repeatability score to the landmark.

13. The system of claim 12, wherein, the landmark is used for computing the compensation parameter only in response to the quality/repeatability score of the landmark being at least a predetermined value.

* * * * *